United States Patent
Nathanson

(10) Patent No.: US 9,922,557 B2
(45) Date of Patent: *Mar. 20, 2018

(54) AUTOMOTIVE TELEMETRY PROTOCOL

(71) Applicant: Paxgrid Telemetric Systems, Inc., Southfield, MI (US)

(72) Inventor: Martin D. Nathanson, Toronto (CA)

(73) Assignee: DrivePath, LLC, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/495,518

(22) Filed: Apr. 24, 2017

(65) Prior Publication Data

US 2017/0221357 A1    Aug. 3, 2017

Related U.S. Application Data

(63) Continuation of application No. 14/014,851, filed on Aug. 30, 2013, now Pat. No. 9,633,562, which is a continuation of application No. 13/022,101, filed on Feb. 7, 2011, now Pat. No. 8,560,609, which is a continuation of application No. 12/535,502, filed on Aug. 4, 2009, now abandoned, which is a continuation of application No. 11/616,203, filed on Dec. 26, 2006, now Pat. No. 7,593,999, which is a continuation of application No. 10/014,889, filed on Dec. 14, 2001, now abandoned, which is a continuation of application No. PCT/CA01/01420, filed on Oct. 15, 2001.

(60) Provisional application No. 60/255,896, filed on Dec. 18, 2000, provisional application No. 60/252,885, filed on Nov. 27, 2000, provisional application No. 60/239,920, filed on Oct. 13, 2000.

(51) Int. Cl.
| | |
|---|---|
| G08G 1/16 | (2006.01) |
| G08G 1/0965 | (2006.01) |
| H04L 29/08 | (2006.01) |
| G08G 1/09 | (2006.01) |
| H04L 12/24 | (2006.01) |
| H04L 29/06 | (2006.01) |
| H04W 84/18 | (2009.01) |

(52) U.S. Cl.
CPC .......... *G08G 1/0965* (2013.01); *G08G 1/091* (2013.01); *H04L 41/0213* (2013.01); *H04L 67/12* (2013.01); *H04L 69/164* (2013.01); *H04W 84/18* (2013.01)

(58) Field of Classification Search
CPC ..... G08G 1/0965; G07C 5/008; G07C 5/0606
USPC ........................................ 340/901–905, 425.5
See application file for complete search history.

(56) References Cited

U.S. PATENT DOCUMENTS 9,633,562 B2 *   4/2017   Nathanson ............. G07C 5/008

* cited by examiner

Primary Examiner — Daryl Pope

(74) Attorney, Agent, or Firm — Howard & Howard Attorneys PLLC

(57) ABSTRACT

Apparatus whereby one or more vehicle nodes are configured for use in a vehicular communications network which provides for exchange of data between a plurality of vehicle nodes, the vehicle node comprising at least one on-board computing unit which is operable to broadcast identity messages to, and to receive identity messages from the plurality of neighboring vehicle nodes on at least one roadway and the at least one on-board computing unit further comprising a transmitter and a receiver, transmitting operational vehicle event messages notifying the plurality of neighboring vehicle nodes of impending operational vehicle events that includes at least one of acceleration, brake application, lane mergers, turn or lane changes, or passing of neighboring vehicles.

12 Claims, 21 Drawing Sheets

Standard UDP Segment

Paxgrid UDP Segment (for ATP)

| PDU TYPE | Request ID | OID | Value Type | OID | Value Type | OID | Value Type | OID | Value Type |
|---|---|---|---|---|---|---|---|---|---|
| GET | | GPS Position | Lat-long | Engine Speed | Integer | Road Speed | Integer | Engine Temperature | Integer |

FIG.8

AUTOMOTIVE TELEMETRY PROTOCOL

This application is a Continuation of U.S. patent application Ser. No. 14/014,851, filed Aug. 30, 2013, which is a Continuation of U.S. patent application Ser. No. 13/022,101, filed Feb. 7, 2011, now U.S. Pat. No. 8,560,609, which is a Continuation of U.S. patent application Ser. No. 12/535,502, filed Aug. 4, 2009, abandoned, which is a Continuation of U.S. patent application Ser. No. 11/616,203, filed Dec. 26, 2006, now U.S. Pat. No. 7,593,999, issued Sep. 22, 2009, which is a Continuation of U.S. patent application Ser. No. 10/014,889, filed Dec. 14, 2001, abandoned, which is a Continuation of International Application No. PCT/CA01/01420 (designating the United States), filed Oct. 15, 2001, which claims benefit of U.S. Patent Application Nos. 60/239,920 filed Oct. 13, 2000; 60/252,885, filed Nov. 27, 2000; and 60/255,896, filed Dec. 18, 2000. All of the above-referenced patents and patent applications are incorporated herein by reference.

Also, incorporated by reference are the following applications/patents which are not part of the domestic priority data claimed by Applicant: International Application No. PCT/CA00/00712 (designating the United States), was filed Jun. 19, 2000, and claims benefit of U.S. Patent Application Nos. 60/139,573, filed Jun. 17, 1999; 60/148,270, filed Aug. 11, 1999. U.S. patent application Ser. No. 09/556,289, was filed Apr. 24, 2000, and is a Continuation-In-Part of U.S. patent application Ser. No. 09/140,759 (now U.S. Pat. No. 6,263,268), filed Aug. 26, 1998, which claims the benefit of U.S. Patent Application No. 60/056,388, filed Aug. 26, 1997, and the '289 Application is a Continuation-In-Part of international Application No. PCT/CA98/00986, filed Oct. 23, 1998 (which designates the U.S. and was published in English as International Publication No. WO 99/22497 on May 6, 1999), which claims benefit of U.S. Patent Application No. 60/063,218, filed Oct. 23, 1997, and the '289 Application claims the benefit of U.S. Patent Application No. 60/148,270, was filed Aug. 11, 1999, and U.S. Patent Application No. 60/187,022, was filed Mar. 6, 2000. All of the above are also incorporated herein by reference.

BACKGROUND OF THE INVENTION

1. Field of the Invention

The present invention relates to automotive telemetry protocols and their use in Intelligent Transportation Systems.

2. Description of the Related Art

Conventionally, vehicles have been known to exchange data with a diagnostic computer system (such as in a repair garage) over a hardwired or infrared data link, or a regulatory computer system (such as an electronic toll highway) by a data link using a low power transponder.

More sophisticated vehicular telemetry for commercial fleets has been made possible in the last several years through both terrestrial and satellite RF packet networks. In these vehicular telemetry systems, vehicle sensor data can be transported over wireless data links to a computer that is programmed to monitor and record automotive phenomena and to support database systems for vehicular maintenance, without the need for the vehicle to be in a particular service bay for example. However, these systems are relatively expensive to operate.

A considerable amount of research is being dedicated to developing feasible Intelligent Vehicle Highway Systems (IVHS) which are computer-assisted methods to manage highway infrastructures, synchronize traffic lights, measure traffic flow, to alert drivers to ongoing traffic conditions through electronic billboards and other innovations aimed at improving the quality and efficiency of road transportation systems for vehicles.

The California Air Resources Board (CARB) has been a leader in establishing standards for monitoring vehicle emissions. A recent CARB initiative, known as OBD-III, is the third generation of on-board diagnostic requirements, calling for an emissions regulatory agency to retrieve, remotely, diagnostic data from vehicles, thereby avoiding the need for a visit to a clean air inspection station. In one pilot program, a low-power transponder was used on each vehicle, capable of transferring data between the vehicle and a roadside receiver. Of course, in order for the OBD-III proposal to proceed, each vehicle must have a system capable of collecting and dispatching the requested data through the transponder. CARB is actively reviewing currently available technologies and is surveying the telecommunications industry to see what future equipment is planned. The operating platforms tested thus far by CARB have been relatively cumbersome and have limited capability to be used for other data exchange needs in the future. There is interest in finding a platform that will be economical to operate in order to minimize the financial burden placed on the consumer to implement the proposal.

Moreover, it would be desirable for the chosen platform to be capable of doing more than just sending diagnostic information to a clean air agency. Both the telecom and auto industries are looking at ways to utilize the tremendous business opportunities of reaching urban commuters in their vehicles while they devote several hours each day to their commute.

Vehicular traffic has become a major problem for urban planners. With land values skyrocketing and land-use issues becoming more of a concern, planners are looking for ways of getting more vehicles through existing commuter arteries as an alternative to expanding them. It is also known that the actual volume of traffic handled by a thoroughfare plummets when traffic becomes congested. Therefore, it would be desirable to have vehicles which are capable of exchanging data with themselves as a way to control such things as safe driving distances to avoid collisions and exchanging data with traffic monitoring systems to control such things as driving speeds.

It is therefore an object of the present invention to provide an improved platform for vehicular telemetry.

It is a further object of the present invention to provide an improved vehicular telemetry system which is relatively inexpensive, yet capable of exchanging a range of useful data through a data communications system between a vehicle and a fixed location.

It is still a further object of the present invention to provide a vehicle communications system in which the vehicles therein are each capable of communicating both through a data communications system and with themselves.

SUMMARY OF THE INVENTION

In one of its aspects, the present invention provides a method of conveying vehicle operation data from a vehicle to a remote monitoring recipient, comprising the steps of:
  establishing a data link between the vehicle and the remote monitoring recipient;
  collecting vehicle operation data from data sources in the vehicle;
  packaging the vehicle operation data in a data packet using protocol derived from SNMP; and conveying the data packet over the data link.

In another of its aspects, the present invention provides a method of conveying vehicle operation data from a vehicle server to a remote monitoring client, comprising the steps of:
  establishing a data link between the vehicle and the remote monitoring client;
  collecting vehicle operation data from data sources in the vehicle server;
  packaging the data in a protocol data unit having a protocol data unit payload, the payload including a plurality of VARIABLE BINDING fields, each VARIABLE BINDING field having an OBJECT IDENTIFIER field of two bytes, a VALUE TYPE field of one byte and a VARIABLE BINDING value of a size according to the VALUE TYPE field; and
  conveying the protocol data unit over the data link.

In still another of its aspects, the present invention provides a method of collecting vehicle operation data from a vehicle for later transmission to a remote monitoring recipient in a manner to minimize the bandwidth requirements for the later transmission, comprising the steps of:
  providing a vehicle on-board computing device;
  providing a number of data acquisition modules, each to measure one or more operating characteristics of the vehicle, the operating characteristics corresponding to current values of a set of managed objects;
  interfacing the vehicle on-board computing device with each of the data acquisition modules;
  configuring the vehicle on-board computing device to;
    a) form a diagnostic information base for receiving and storing values for each of the managed objects from each of the corresponding data acquisition modules;
    b) assemble an event report based on information contained in the diagnostic information base; and
    c) package the event report in a protocol data unit according to an SNMP-derived protocol.

Preferably, the operating characteristics include such things as GPS position, engine speed, road speed, odometer, or engine temperature, or an OBD-II parameter related to vehicle emissions. One OBD-II parameter is misfire detection, though others are also applicable, such as the $0_2$ sensor.

In one embodiment, the present invention further comprises the step of enabling the vehicle on-board computing device to:
  a) establish a data link with the remote monitoring recipient; and
  b) convey the protocol data unit over the data link.

The collecting and packaging and conveying steps may occur at the same or they may occur at different times. The computing device, in this case, may be enabled to collect data at regular or irregular intervals and accumulate some types of data for later transmission, such as distance travelled, or other types of data for immediate transmission, such as a current GPS position or an exceeded regulatory threshold. Alternatively, there may be some instances where the computing device is enabled to convey the protocol data unit over a wired or other data link.

Preferably, the method includes the step of enabling the remote monitoring recipient to issue a GET protocol data unit to retrieve the current values for a specific set of managed objects from the vehicle on-board computing device, In this case, the remote monitoring recipient is enabled to wait for an acknowledgement to the GET protocol data unit by the vehicle on-board computing device.

Preferably, the method includes the step of enabling the vehicle on-board computing device to issue a TRAP protocol data unit to report a vehicular event. Preferably, the method includes the step of enabling the vehicle on-board computing device to:
  a) store threshold values or a reporting interval for each vehicular event; and
  b) issue each TRAP protocol data unit, either when a threshold value has been exceeded or at a corresponding reporting interval.

In this case, the TRAP protocol data unit may report such vehicle reports as GPS position and the like.

Preferably, the method includes the step of issuing an INFORM protocol data unit from the vehicle to report an exceptional vehicular event. The method, in this case, preferably includes the step of enabling the vehicle on-board computing device to:
  a) store any one of a plurality of specifications for exceptional vehicular events in the diagnostic information base, including one or more regulatory exceptions, maintenance exceptions or operational exceptions; and
  b) issue the INFORM protocol data unit when any one of the specified events occurs.

In one embodiment, the diagnostic information base contains a specification of what constitutes the occurrence of an "event" and not the event itself. When the event occurs, a record of the event is made in a transmission queue and remains there until an acknowledgement message (in this case a RESP message) is received by the onboard computing device. Accordingly, the method provides, in one embodiment, for a storage of vehicular events in a register or other temporary storage module, the events being specified in the diagnostic information base.

The managed object, for example, may be ENGINE TEMPERATURE, and the conditions for that managed object may be a MAXIMUM THRESHOLD, CURRENT VALUE, and a TIME COUNT for recording when the current value is to be measured.

An example of a diagnostic information base is shown in the following table:

TABLE 1

| MANAGED OBJECT | VALUE 1 | VALUE 2 | VALUE 3 | VALUE 4 |
|---|---|---|---|---|
| TE: ENGINE TEMPERATURE | THRESHOLD | CURRENT VALUE | MEASURE EVERY 10 MINUTES | |
| TO2: O2 SENSOR | THRESHOLD | CURRENT VALUE | MEASURE EVERY 30 MINUTES | |

An example of an event recording register is shown in the following table showing the current values for the managed objects at a particular time T=T1

TABLE 2

$X_{T1}$
$Y_{T1}$

In one example, the INFORM protocol data unit is sent as a result of a regulatory threshold level being exceeded.

Preferably, the method includes the step of enabling the vehicular onboard computing device to wait for a confirmation that a previous INFORM protocol data unit has been logged in a data base by the remote monitoring recipient. In this case, the method preferably also includes the step of re-transmitting the INFORM protocol data unit in the absence of a confirmation that a previous INFORM protocol data unit has been logged in a database by the remote monitoring recipient.

Preferably, the method includes the step of enabling the remote monitoring recipient to issue a SET protocol data unit to the vehicle on-board computing device to set one or more of the managed objects.

The wireless data link may be a radio frequency band under the IEEE 802.11 standard, a satellite RF packet network or a terrestrial RF packet network, or others.

In one embodiment, the protocol data unit is a "request"-type (GET, SET or INFORM) protocol data unit, the protocol data unit excluding the ERROR STATUS and ERROR INDEX fields of the SNMP protocol.

In one embodiment, the protocol data unit excludes the LENGTH field of each variable binding of the SNMP protocol.

In still another of its aspects, the present invention provides a method of conveying vehicle operation data from a vehicle to a remote monitoring recipient, comprising the steps of:
  establishing a data link between the vehicle and the remote monitoring recipient;
  collecting vehicle operation data from data sources in the vehicle;
  packaging the vehicle operation data in a data packet using protocol derived from SNMP; and
  conveying the data packet over the data link, the protocol data unit being issued in response to a request by the remote monitoring recipient and containing both the request and requested values in the request and being encapsulated within a single message and in a single unfragmented network packet.

In still another of its aspects, the present invention provides a method of collecting vehicle operation data from a vehicle for later transmission to a remote monitoring recipient in a manner to minimize the bandwidth requirements for the later transmission, comprising the steps of:
  providing a vehicle on-board computing device;
  providing a number of data acquisition modules, each to record a current value of a managed object of the vehicle;
  interfacing the vehicle on-board computing device with each of the data acquisition modules;
  configuring the vehicle on-board computing device to:
    a) form a diagnostic information base for receiving and storing values of the managed objects from each of the data acquisition modules;
    b) assemble an event report based on information contained in the diagnostic information base; and
    c) package the event report into a protocol data unit, the protocol data unit including a protocol data unit payload having a plurality of VARIABLE BINDING fields, each VARIABLE BINDING field having an OBJECT IDENTIFIER field of two bytes, a VALUE TYPE field of one byte and a VARIABLE BINDING value of a size according to the VALUE TYPE field.

In one embodiment, the protocol data unit includes a header having a PDU TYPE data element with a value corresponding to one of a set of values, the set including a GET value, a SET value, a TRAP value, an INFORM value and a RESPONSE value.

In still another of its aspects, the present invention provides a computer implemented system for conveying vehicle operation data from a vehicle to a remote monitoring recipient, comprising:
  a vehicle on-board computing device in communication with a number of vehicle operation data sources in the vehicle;
  a wireless communications device for establishing a wireless data link with the vehicle on-board computing device and the remote monitoring recipient;
  the vehicle on-board computing device being enabled to package the vehicle operation data in a data packet using protocol derived from SNMP for transmission to the remote monitoring recipient over the wireless data link.

In still another of its aspects, the present invention provides a computer-readable data structure for collecting and conveying vehicle operation data from a vehicle to a remote monitoring recipient, comprising:
  an application module for receiving vehicle operation data from a number of data sources in the vehicle;
  a storage module for storing a diagnostic information base, the diagnostic information base including a number of managed objects for a number of vehicle operation parameters and a number of values for each of the managed objects; and
  a communication module for conveying protocol data units under a protocol derived from SNMP over a wireless data link to the remote monitoring recipient.

In still another of its aspects, the present invention provides a computer program product encoded in a computer readable medium including a plurality of computer executable steps for a computer on-board a vehicle for collecting and conveying vehicle operation data from the vehicle to a remote monitoring recipient, comprising:
  receiving vehicle operation data from a number of data sources in the vehicle;
  storing, in a diagnostic information base, a plurality of managed objects for each of a number of vehicle operation parameters;
  establishing a wireless data link between the computer and the remote monitoring recipient.
  conveying a number of protocol data units under a protocol derived from SNMP over a wireless data link to the remote monitoring recipient.

In still another of its aspects, the present invention provides a signal propagated on a carrier medium, the signal including a packaged protocol data unit containing a payload encoding predetermined operational data of an automotive vehicle, according to a protocol derived from SNMP.

Preferably, the payload includes a plurality of VARIABLE BINDING fields, each VARIABLE BINDING field having an OBJECT IDENTIFIER field of two bytes, a VALUE TYPE field of one byte and a VARIABLE BINDING value of a size according to the VALUE TYPE field data unit.

Preferably, the payload includes a GPS position segment, a GPS heading segment, a vehicle speed segment or an OBDII vehicle emissions segment.

In still another of its aspects, the present invention provides a system for conveying vehicle operation data from a vehicle to a remote monitoring recipient, comprising:
  vehicle on-board computing means in communication with a number of vehicle operation data source means in the vehicle;
  wireless communications means for establishing a wireless data link with the vehicle on-board computing means and the remote monitoring recipient;
  the vehicle on-board computing means being enabled to package the vehicle operation data in a data packet using protocol derived from SNMP for transmission to the remote monitoring recipient over the wireless data link.

In still another of its aspects, the present invention provides a method of conveying vehicle operation data from a vehicle to a remote monitoring recipient, comprising:

a step for establishing a data link between the vehicle and the remote monitoring recipient;

a step for collecting vehicle operation data from data sources in the vehicle; a step for packaging the vehicle operation data in a data packet using protocol derived from SNMP; and a step for conveying the data packet over the data link.

In yet another of its aspects, there is provided a computer-readable data structure for collecting and conveying vehicle operation data from a vehicle to a remote monitoring recipient, comprising:

an application module for receiving vehicle operation data from a number of data sources in the vehicle;

a storage module for storing a diagnostic information base, the diagnostic information base including a number of managed objects for a number of vehicle operation parameters and a number of values for each of the managed objects; and a communication module for conveying protocol data units under a protocol derived from SNMP over a wireless data link to the remote monitoring recipient.

In still another of its aspects, the present invention provides a communications network for exchanging data between a plurality of vehicles, comprising a computing unit onboard a corresponding vehicle, wherein the computing unit in a given vehicle is operable to broadcast identity messages and to receive equivalent identity messages from other vehicles in an adjacent region, where said messages are used to identify the neighbouring vehicles in the network for exchanging data with selected ones of the vehicles therein.

Preferably, the computing unit is operable to update a list of neighbouring vehicles. In this case, the computing unit may add new neighbour vehicles to the list as identity messages are received from new vehicles entering the region. Alternatively, the computing unit may delete a given neighbour vehicle from the list when identity messages are not received from the given neighbour vehicle after a predetermined period of time. Alternatively, the computing unit deletes a given neighbour vehicle vehicles from the neighbour database when the lack of identity messages received from the given neighbor vehicle indicate that the neighbour vehicle has left the adjacent region.

Preferably, the medium of communications is a high frequency channelized RF band and its use by each of said computing units is controlled according to the IEEE 802.11 Medium Access Control (MAC) protocol.

Preferably, the computing units are Internet addressable.

Preferably, the computing units are IPv6 addressable.

Preferably, the computing units exchange data using an SNMP-derived protocol.

Desirably, the identity messages include GPS information and the IEEE 802.11 MAC address of the sender, wherein the GPS information includes latitude, longitude, speed and heading information.

In one embodiment, all vehicles in the neighborhood broadcast their identity messages over a discovery time period that is sufficient to allow any given vehicle to recognize all its neighbours. Both the length of the discovery period and the geographic size of the region may be adjusted in proportion to the average speed of the vehicles in the neighborhood.

If desired, the channel selection for transmission of at least some messages may be based on GPS heading.

In one embodiment, each of the computing units further comprises a transmitter and receiver capable of transmitting and receiving messages under an SNMP protocol.

In another of its aspects, the present invention provides an automotive vehicle as above.

In still another of its aspects, the present invention provides a data structure comprising a speed segment, a heading segment and position segment. Preferably, the position segment includes a longitude portion and a latitude portion.

In another of its aspects, the present invention provides a signal propagated on a carrier medium, the signal including a speed segment, a heading segment and a position segment. Preferably, the position segment includes a longitude portion and a latitude portion.

In still another of its aspects, the present invention provides a vehicle comprising an onboard computing unit operable to receive messages from other vehicles in an adjacent region for assembling a neighbourhood list for exchanging data with selected ones of the vehicles listed therein.

In yet another of its aspects, the present invention provides computer program product for operating a programmable computer system on board a motor vehicle, comprising a computer readable medium including the computer executable steps of receiving messages from other vehicles in an adjacent region and of assembling a neighbourhood list for exchanging data with selected ones of the vehicles listed therein.

In yet another of its aspects, the present invention provides a motor vehicle comprising an onboard general purpose computer and a spread spectrum radio, the spread spectrum radio operable to establish a data link with a radio in at least one other neighbouring vehicle, wherein the computer is operable to record messages from at least one other vehicle in an adjacent region for assembling a neighbourhood list, and to identify at least one vehicular event from data received on the data link.

In yet another of its objects, the present invention provides a computer-readable data structure for collecting and conveying vehicle operation data from a vehicle on-board computing device and a remote monitoring recipient, comprising:

a module for indexing a series of protocol values and corresponding requests and responses for data exchange between the vehicle on-board computing device and the remote monitoring recipient;

a module for indexing a series of managed objects for a number of operating characteristics of the vehicle; and a module for recording values for each of the managed objects.

Preferably, the data structure further comprises a module for indexing an identity for each remote monitoring recipient.

Preferably, the data structure also includes a module for indexing a list of one or more authorization levels for each remote monitoring recipient. These authorization levels may be used to impose conditions on the managed object values being conveyed to the recipient. Some recipients may be entitled to all of the managed object values, others to only some of the them, and still other requesting entities (those not in the list) entitled to none at all.

BRIEF DESCRIPTION OF THE DRAWINGS

Several preferred embodiments of the present invention will be provided, by way of example only, with reference to the appended drawing, wherein:

FIG. 8 is a schematic view of a GET protocol data unit example;

FIG. 16b is a time plot of beacon frames issued by vehicles in network of FIG. 16a;

DESCRIPTION OF THE PREFERRED EMBODIMENTS

Figure 1:
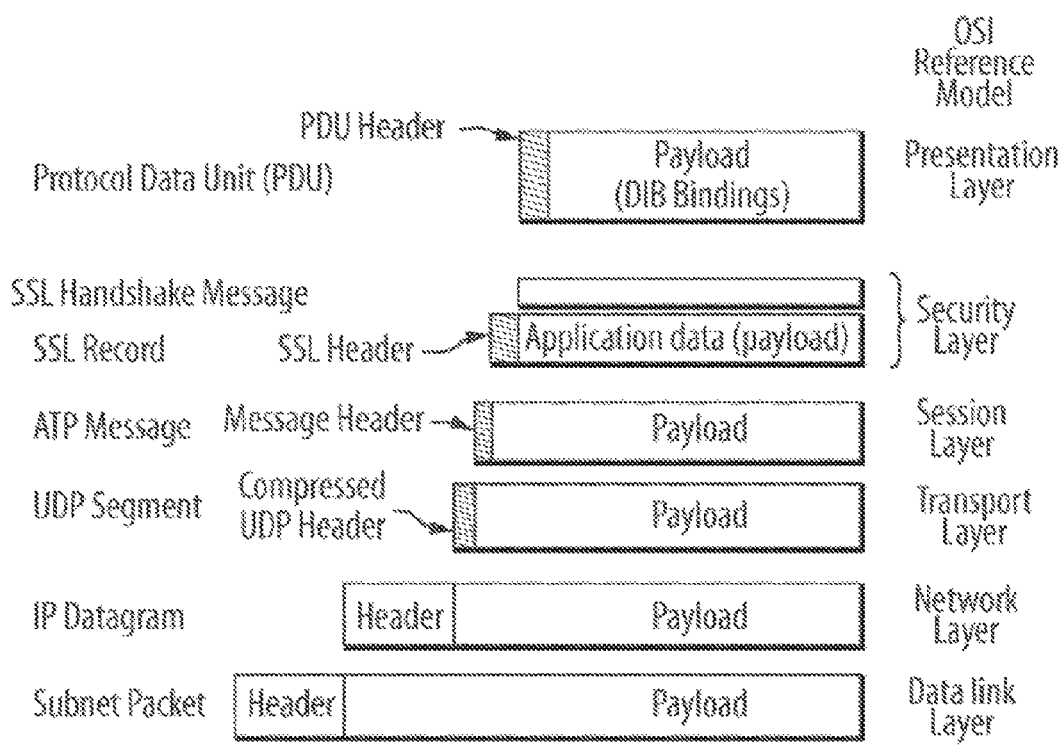
FIG. 1 is a schematic view of a protocol stack.
Figure 2:
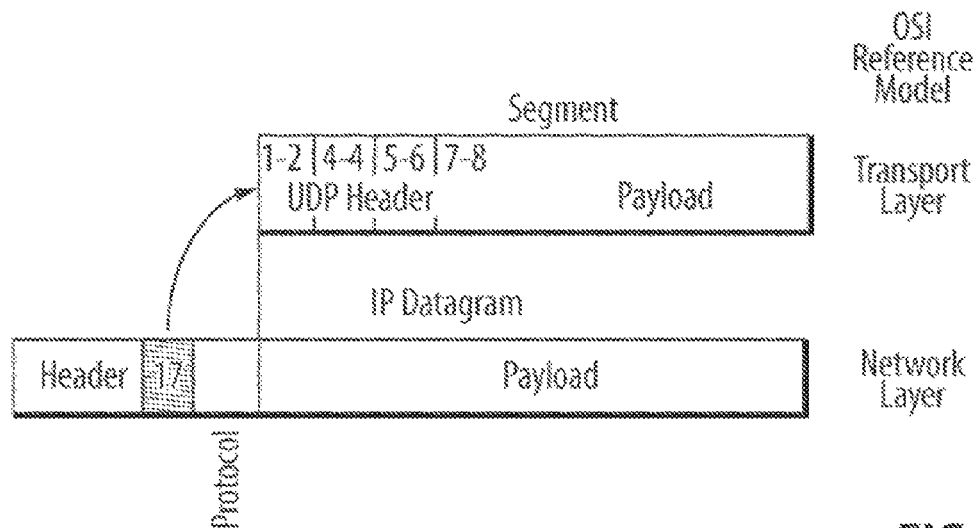
FIG. 2 is a schematic view of a UDP based protocol.
Figure 3:
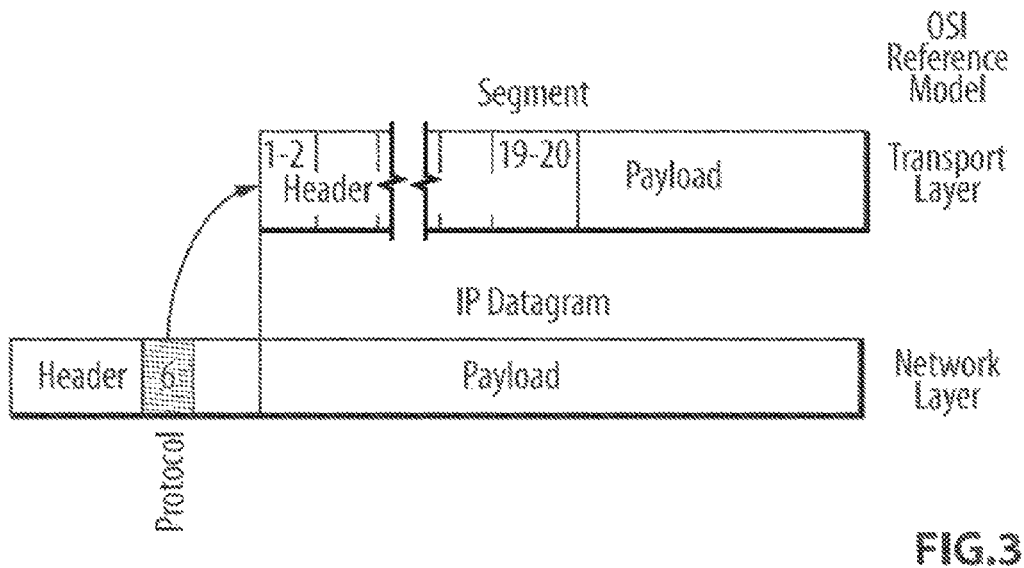
FIG. 3 is a schematic view of a TCP based protocol.

Described herein below is a system and method which implements a peer-to-peer Internet-based protocol stack for vehicular diagnostic telemetry. This stack is intended to reside in on-board vehicular embedded systems and to enable remote PC workstations to interact with these systems using standard communications API's such as Winsock.

The Session and Presentation layers of the stack are labeled the Automotive Telemetry Protocol (ATP). ATP addresses the need for a clear specification of the message formats, protocol procedures, security mechanisms and external interfaces by which software can be developed for implementation of OBD-III[1] on different mobile and fixed computing platforms in an inter-operable fashion.

[1] On-Board Diagnostics III. Proposed legislation, spearheaded by the California Air Resources Board (CARB) requiring emissions-related diagnostic information from Engine Control Modules (ECM's) in vehicles to lend itself to retrieval over mobile communications networks.

Reviewed below are the objectives sought and then provides a more detailed description of the layers 3-6 (network, transport, session and presentation). It has been shown that the Session and Presentation layers are derived from the specifications for Simple Network Management Protocol (SNMP). The underlying transport mechanism is a UDP/IP stack with the UDP header compressed in the interest of bandwidth efficiency.

The issue of security is also addressed below, and the ability to configure an implementation of the stack such that specific sources of data can be restricted to specific requesting entities ("clients"). The application of the Secure Socket Layer (SSL) protocol is reviewed in order to demonstrate the authentication of requests for information from external sources by the on-board computer.

The protocol stack is applied to the exchange of operational data between vehicles on the road. This is based on the concept of an "ad-hoc network" established within a "neighborhood" surrounding any given vehicle. The ad-hoc network can co-exist with a data link to the Internet, using the same RF medium, provided that a roadside infrastructure is deployed. The potential of this technology to improve highway safety is illustrated with various examples of vehicle-to-vehicle exchange of operational information.

Also described a method for the integration of IEEE 802.11 compliant technology in both intelligent vehicle and intelligent highway systems. Reference will be made herein below to Intelligent Transportation Systems or ITS to encompass any component of such systems, whether on board a vehicle or part of the roadway infrastructure.

Much of the current focus of intelligent vehicle technology is directed at collision avoidance based on radar. On the other hand, intelligent highway system development has been largely predicated on the use of short-range communications between the vehicle and the roadway infrastructure. However experts from both the automotive OEM's as well as from government agencies have recognized that vehicle-to-vehicle communications constitutes an area that should be explored going forward.

The IEEE 802.11 specification is a relatively new standard for high-speed wireless Local Area Networks (LAN). It uses a method of RF transmission known as spread spectrum for which the 2.4 GHz range has been made available as an unlicensed band. This technology is also identified under the commercial banner Wi-Fi (Wireless Fidelity). Its potential for application in the area of ITS is based on its commercial potential. There are now Wi-Fi products commercially available that make it possible to create network infrastructures supporting mobility for computer devices. Network interface cards (NIC's) are available enabling personal computers, including laptops and notebooks, to use Wi-Fi. As the popularity of Wi-Fi grows, it is expected that more mobile wireless appliances (e.g. PDA's, cell phones) will appear in the marketplace that exploit a growing infrastructure of access points through which users can connect to the Internet wirelessly at bit transfer rates that currently reach 11 Mbps.

One feature of IEEE 802.11 is the notion of ad hoc networking, which enables two or more devices to communicate directly with one another without requiring a fixed access point. In other words, the network infrastructure is not a necessary condition for connectivity between mobile devices. As a result, IEEE 802.11 can support concurrent vehicle-to-vehicle and vehicle-to-infrastructure communications in novel and unexpected ways. This combination of flexibility, from a technical perspective, and commercial appeal, is the essential rationale for using IEEE 802.11 in ITS.

The method described in this document adheres to the principle of implementing fully-compliant 802.11 nodes, without modification of the specification, to meet the requirements of ad hoc networking for ITS.

Relationship to ATP

The methods described here are intended to provide a platform on which the Automotive Telemetry Protocol (ATP) can operate between two vehicles. ATP is a session level protocol derived from SNMP that enables a bi-directional client-server relationship to be established between the two end points of the mobile communications [1]. In the context of vehicle-to-vehicle communications, ATP allows a "client" vehicle to send an asynchronous notification to specified "server" vehicle requiring acknowledgement. This request-response mechanism has applications described later in this document.

Protocol Stack

FIG. 1 illustrates the complete protocol stack that is required for OBD III, using the OSI (Open Systems Interconnect) reference model.

The protocol stack is intended to meet one or more of the following objectives:

Wireless Data Link Transparency

This refers to the need for technology-independence. It should be possible for OBD-III compliance to be met using a variety of wireless data link technologies. Mobile devices should be able to use packet cellular, RF packet networks, wireless LAN (Wi-Fi), satellite or any combination thereof.

Internet Connectivity (Beyond OEM Portals)

It should be possible for workstations at remote IP addresses to interact directly with an on-board vehicular device that interfaces to OBD and other operational data within the vehicle. In other words, full Internet connectivity between the vehicle and any remote host is a desired outcome that will enable authorized hosts to run applications that do not have to transit the OEM's portals. This implies that the vehicular device needs to comply with standard protocol specifications that support peer-to-peer exchanges with any authorized host on the Internet. (See Security below in relation to the notion of authorized host).

Efficient Bandwidth Utilization

The data exchange between fixed sites, responsible for monitoring, and the mobile units should not be unnecessarily "verbose". There is a tendency in wireless applications to assume that some form of "Web" presentation is required to simplify the user interface (UI), which has been partly responsible for the development of Wireless Application Protocol (WAP). WAP is a technique that offers some compromise between the UI features of the Web and the need for bandwidth efficiency over airlinks. None of these considerations take into account the fact that telemetry traffic is quite different in its purpose than other forms of wireless data and should be supported in a different, yet standards-based manner.

Standardized Data Exchange Mechanism

The higher levels (Session and Presentation) of the protocol stack need to be standardized, for obvious reasons. This will simplify the task of compliance with OBD-III in all jurisdictions that choose to implement the regulations.

Security

The need for security has been stressed by CARB. Political acceptance of the OBD-III concept is dependent on the public's confidence that the technology will not become a form of state intrusion into individual privacy. Motorists and vehicle owners should have the perception that electronic controls over the release of information are at least as effective as those that are currently in use in Web-based E-commerce. It is contemplated that the present system will, if needed, be capable of implementing public key cryptography above the Session layer, in much the same manner that it is done in business-to-consumer E-commerce. This ensures that, although there is connectivity with any host on the Internet, only those hosts that obtain authorization through the security mechanisms will receive any "attention" from the vehicle.

Network and Transport Layers UDP/IP—

In order to understand the context in which ATP operates, the underlying transport mechanism which supports it's needs to be considered. The User Datagram Protocol (UDP) is a transport-level mechanism for "connectionless" client-server communications. UDP constitutes one of the transport protocols that can operate over the Internet. The notion of a "connectionless" protocol refers to the fact that there is no overhead dedicated to the maintenance of reliable end-to-end communications. In this sense, UDP is distinguished from TCP (Transport Control Protocol). The shorter UDP header (8 bytes) reflects this difference.

The basic protocol data unit (PDU) of the Internet is called a datagram. The datagram header contains a field that is used to designate the protocol at the next level of the stack. The IANA[2] f values for UDP and TCP are, respectively, 17 and 6. The figures below show how the payload of different datagrams can be intended for UDP and TCP, depending on the value of the "protocol" field in the datagram header.

[2] IANA (Internet Assigned Numbers Authority)

As mentioned above, the standard UDP header is eight (8) bytes in length, consisting of:

source port (2 bytes)
destination port (2 bytes)
payload length (2 bytes)
checksum (2 bytes)

In the conventional uses of UDP, the source and destination ports are IANA-approved numbers associated with processes executing within the sender's and the receiver's address spaces, respectively. There is currently no assigned number for the present automotive telemetry application. The present system uses the number OxOA (integer 10) to specify the ATP port.[3]

[3] This number is, as yet, unassigned by IANA.

Compression of the UDP Header—

In the application of automotive telemetry, the overhead of the UDP header would consume wireless bandwidth without providing any significant advantage to the protocol in terms of flexibility or reliability. Both the source and destination ports can be constrained to use the same number. The payload length can be derived from fields in the underlying network packet or data link frame in which the UDP segment is encapsulated. Finally, the checksum can be viewed as redundant, since the underlying data link protocol(s) should incorporate an integrity check of the data stream anyway.[4]

[4] If any of the data links traversed from source to destination do not incorporate integrity checks in the protocol, then the data integrity of ATP can be called into question. However, it is difficult to envision such a case.

Figure 4:
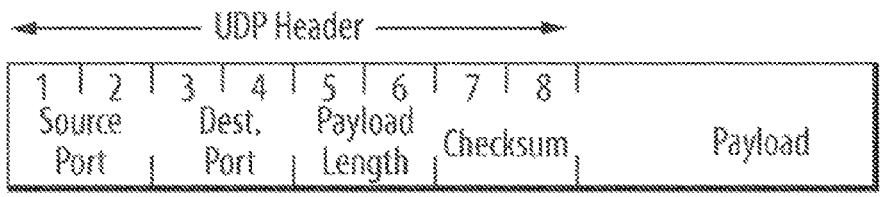
FIG. 4 is a schematic view of a header in a UDP based protocol.
Figure 4:
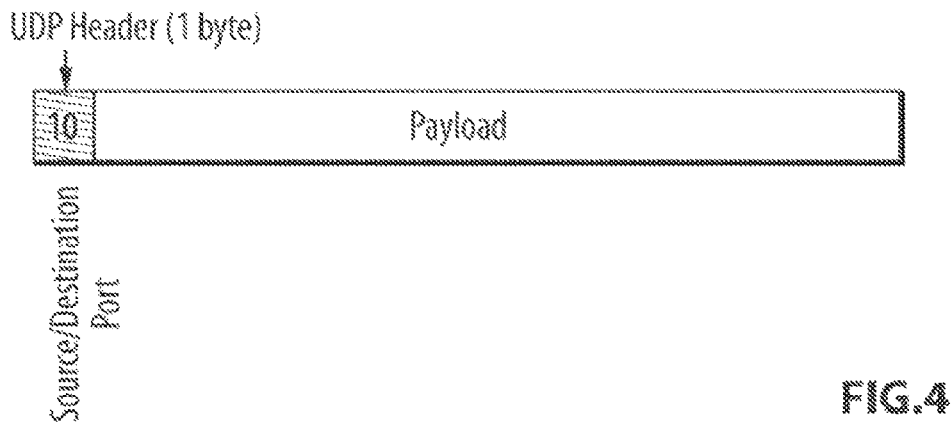

Given the need to minimize wireless bandwidth consumption, the UDP header is, in one embodiment, reduced to 1 byte in the implementation herein of the mobile communications protocol stack, which is illustrated in FIG. 4. The value in this byte (OxOA or integer 10) identifies the ATP port at both the source and destination.

Session and Presentation Layers—

ATP resides conceptually at the Session Layer. It is a request/response mechanism, similar to Simple Network Management Protocol (SNMP), which ensures that for every message from either a mobile unit to the exception base location or vice versa, there is always an acknowledgement.

As such, exception reports from vehicles cannot be discarded by the mobile computing platform until the base system has confirmed that they have been logged to a "persistent storage" database.

The design philosophy of ATP is based on Simple Network Management Protocol (SNMP) which enables remote diagnostics and configuration of communications devices and is the de-facto standard with which elements of the Internet infrastructure must comply. A comparison can be made between remote diagnostics of communications devices and mobile vehicles. This is illustrated graphically in FIGS. 5(a) and (b).

Figure 5A:
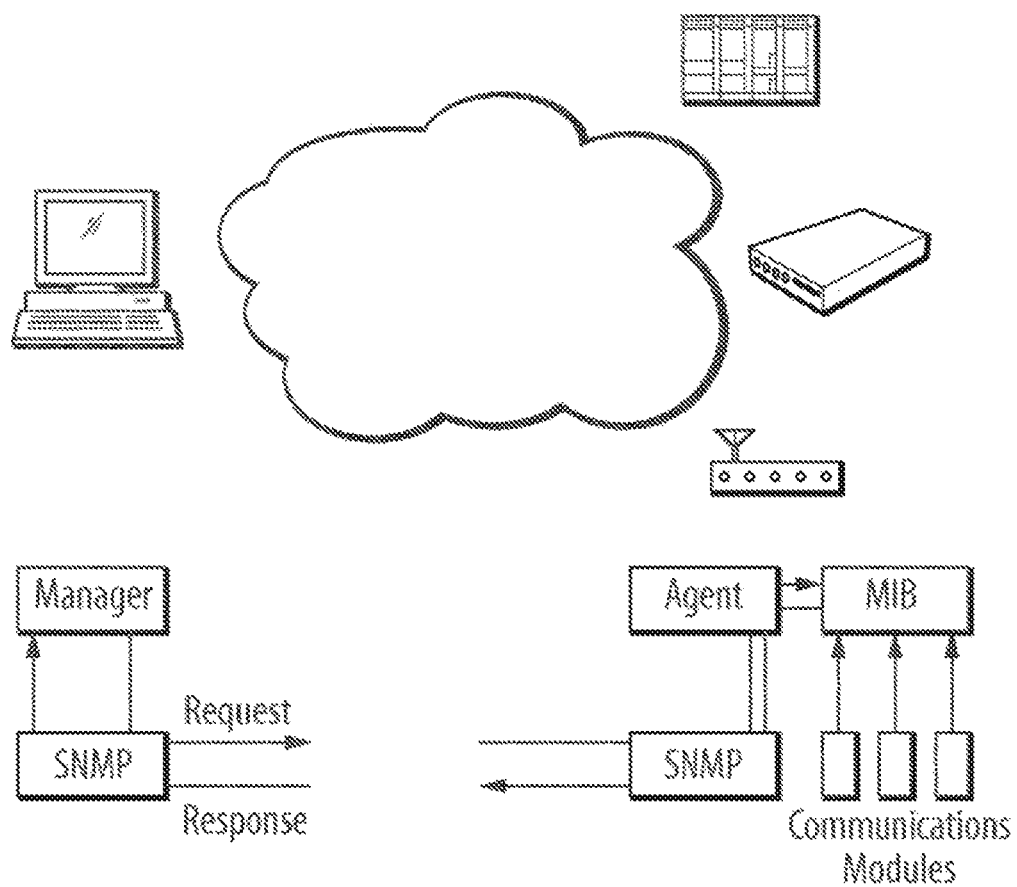
FIGS. 5(a) and (b) are perspective schematic views of two network arrangements.

In SNMP the "managed entity" is typically a communication switching device such as a bridge or router. This managed entity implements an "agent", which is a software module responsible for retrieving requested information and interacting with the remote "manager" through an interface to the communications protocol stack. FIG. 5(a) shows that the top level of this stack is SNMP, which is essentially a combination of the Session and Presentation Layers. The information that a remote manager may request resides in the Management Information Base (MIB), which is a local repository for operational data collected by the device drivers controlling the hardware interfaces to the external world ("Communications Modules"). For instance, a router with an Ethernet adapter maintains statistics reporting the number of inbound and outbound frames transiting the Ethernet interface. This information is cached in the MIB and is retrieved by the Agent on behalf of a remote Manager which has issued a request.

Figure 5B:
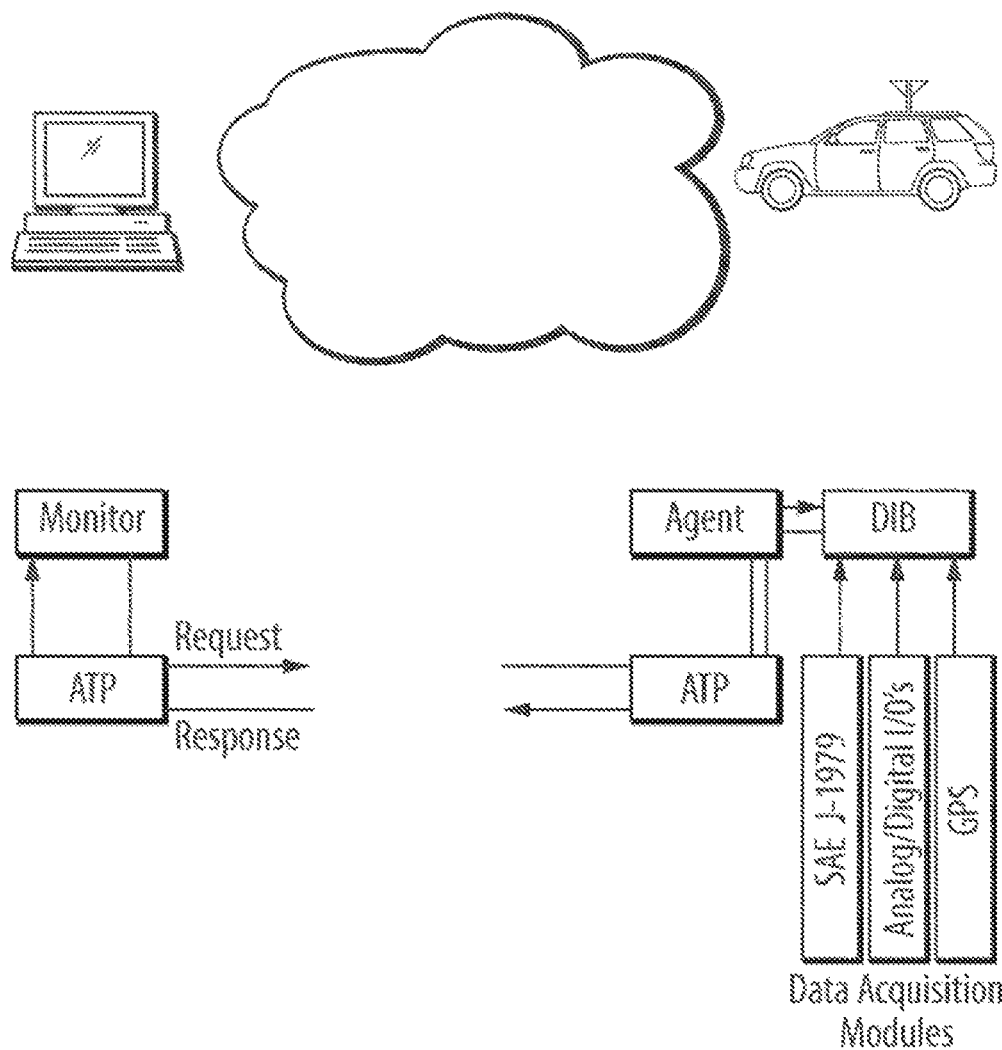

In the case of ATP, shown in FIG. 5(b) below, the entity equivalent to the SNMP Manager is called a Monitor, and the managed entity is a vehicular on-board computing device interfaced to various data acquisition modules[5]. This is called the local data repository a Diagnostic information Base (DIB). The information cached in the DIB originates from various sources such as the ECU diagnostic port, analog and digital sensors, GPS receiver, and so on. The three examples shown in the figure are:

[5] The present version of such a device is called a Universal On-Board Diagnostic Server (U-OBD).

SAE J-1979 (diagnostic test modes required for OBD-II)
GPS receiver
direct analog and digital input channels
This is by no means an exhaustive list of the possible sources of data. Other examples are:
SAE J-2190 (recommended supplement to legislation)
SAE J-2178 (Normal Vehicle Operation)
SAE J-1 708 (heavy truck and bus)
SAE J-1939 (successor to J-1708)

SNMP and ATP Message Formats—

The SNMP message consists of a header[6] and a Protocol Data Unit (PDU). The header contains two fields:

[6] This describes the message header format of the initial version of SNMP. SNMPv3 specifies a more complex format. This will be come useful as a reference point when security mechanism is specified for ATP.

Version Number
This specifics the version of SNMP that is being used by the originator of the message.
Community Name
This serves as a primitive method of authentication. Managers belonging to a community arc said to exist within the same administrative domain. When a management agent receives an SNMP message from a manager containing a community name that it does not recognize, it does not participate in the SNMP operation.

In the present system, it is preferable to eliminate fields that are potentially redundant in order to reduce the consumption of wireless bandwidth. This is the case with the community name since, as will be shown, a much stronger form of authentication is required at the presentation level (i.e. the layer above ATP). A version number will only become necessary once ATP evolves beyond the experimental stage.

SNMP Protocol Operations—

The rest of the SNMP message is the Protocol Data Unit (PDU). There are four (4) basic types of request PDU defined in the SNMP specification[1][7]:

[7] The document in reference [1] is the most recent RFC (Request for Comment) for the initial version of SNMP. The full complement of specifications for SNMP also includes a set of RFC's for SNMPv2, which extends the functionality of SNMP, and a set of RFC's for SNMPv3, which provides security features. The term "SNMP specifications" is used in this document to refer to the full complement of specifications provided in the RFC's published by the Internet Engineering Task Force (IETF).

Get
A manager uses a Get PDU to retrieve an item from an agent's MIB
Set
A Set PDU is used by a manager to set a value in an agent's MIB.
Trap
An agent uses a Trap PDU to send asynchronous notifications or "alerts" to a manager. The manager docs not acknowledge these notifications.
Inform
An Inform PDU is similar to a Trap PDU. Any SNMP entity (either an agent or a manager communicating with another manager) may use an Inform PDU to send asynchronous notifications, In contrast to a Trap PDU, the receiving manager must acknowledge an Inform PDU.

Protocol Data Unit Formats—

Figure 6:
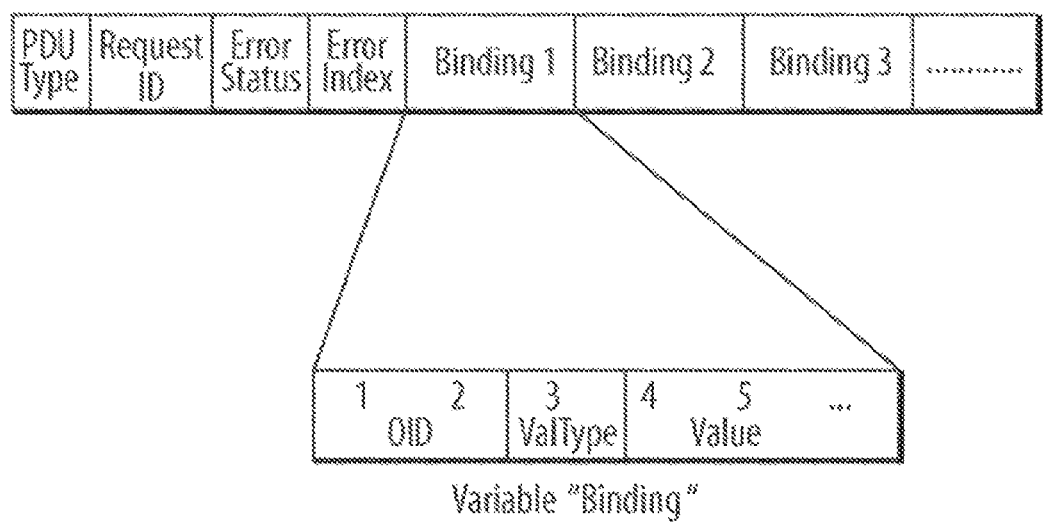
FIG. 6 is a schematic view of an SNMP protocol data unit.

These four categories[8] of PDU are highly suited to ATP. Before their use is examined in the context of automotive telemetry, the actual format specification for the SNMP PDU's will be summarized. FIG. 6 illustrates the format for Get, Set and Response PDU's:

[8] The types of request PDU previously described are categories, within which several sub-types are defined by later versions of SNMP.

PDU Type
This specifics the type of PDU. This is either one of the four request PDU types already described or a response.
Request ID
This is essentially a sequence number for the PDU. The receiver of a request PDU uses this in the response PDU so that the sender can match the response with a previously transmitted request. It also ensures that the receiver can filter out duplicate messages. This is particularly important in mobile wireless networking environments, where transient conditions render mobile nodes frequently "unreachable", which causes the sender to attempt retries. In this kind of scenario, the probability of duplicate messages arriving at the destination is very high.

Figure 7:
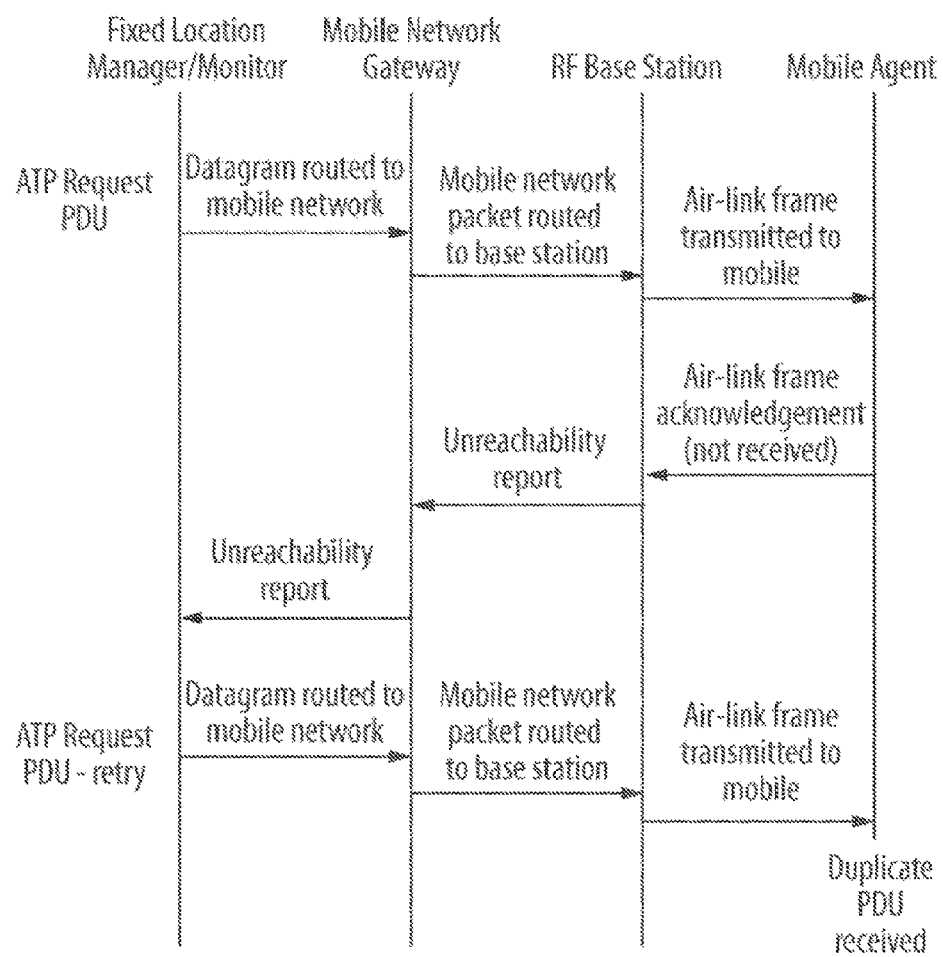
FIG. 7 is a schematic sequential view of a data gram exchange.

This is shown in FIG. 7. A request PDU, encapsulated in a datagram, is routed to a mobile agent through a gateway to a mobile network. It is then wrapped in a mobile network packet and routed to the mobile agent through a wireless link from the closest RF base station. Whereas the mobile agent may receive the airlink frame containing the packet, the RF base station may not "hear" the acknowledgement that is transmitted in response. After the requisite timeout period, the RF base reports back to the mobile network gateway that the mobile agent is "unreachable". When this report is propagated back to the sender (ATP monitor), the message is re-transmitted.

Error Status

This field is used only in response PDU's. It indicates one of a number of errors and error types.

Error Index

This field is used only in response PDU's. It associates the error (if applicable) with one of the "variable bindings" encapsulated in the remainder of the PDU.

Variable Bindings

Each variable binding is an [0130] This is the data field of the SNMP PDU. association of a particular instance of a managed object, which is part of the MIB, with its current value (with the exception of Get request PDU's, for which the value is ignored). The Object Identifier (OID) field identifies the object instance. The value of the variable is encoded according to the triple TLV (type, length, value), where type specifics the data type, length is the number of bytes in which the value is represented in the subsequent stream and value contains the value in length byte. This encoding scheme follows the practice set out in the Basic Encoding Rules (BER) of the Abstract Syntax Notation language (ASN.1).

ASN.1 is an ISO-specified language that is often used to define data exchange protocols at the presentation and applications layers of the OSI model. Its abstract quality enables it to be independent of the different data representation techniques that can be encountered on different computing platforms. Of course, the more abstract the syntax for expressing data structure, the more overhead is required when these structures are serialized in a data stream over a communications network. For this reason, SNMP uses only a subset of ASN.1 (specifically a subset of the BER) in order to restrict the overhead associated with the encoding scheme and therefore preserving bandwidth on the Internet.[2], [3]

In ATP, still with the objective of preserving bandwidth (which is all the more important in the mobile environment of ATP) a further restriction may be imposed on the encoding scheme by eliminating the length field for all but variable length strings. This is shown in the detailed format of the variable binding in the previous illustration of the SNMP PDU format. Only the type field is used. The receiver must infer the length of the value field from the received type.

This same format has been adopted, in one embodiment, as a model for the ATP PDU's. However, in order to limit unnecessary use of bandwidth in the wireless environment, the following exceptions are made:
1. The Error Status and Error Index fields are not present in the request PDU's.
2. The value fields for the variable bindings are not present in Get PDU's.
3. The lengths of all fields in the PDU's, including the OID and value fields in the variable bindings (excluding character strings), are implicit; i.e. they are not explicitly encoded in the data stream as specified by ASN.1. The lengths of ail the header fields arc restricted to one byte. The length of OID fields is two bytes and the lengths of the variable binding values arc dependent on the value type, which is encoded in one byte.

ATP Protocol Operations with the SNMP PDU's—

As already stated, the SNMP PDU's, with the modifications described in the previous section, are applicable to the protocol requirements of ATP. Get PDU's are needed when an ATP Monitor wants to retrieve the current values for a specific set of managed objects from a vehicle. An example is illustrated in the FIG. 8. A vehicle owner could obtain, from a fixed-location workstation, the vehicle's GPS location, engine speed, road speed and engine temperature. Both the request for all of this data and the response from the vehicle containing all the requested values would be encapsulated within a single ATP message and a unfragmented network packet.

The Trap PDU can be used to send event reports from the vehicle for which acknowledgements are not required. A typical example would be a recurring GPS position report. Application software in the on-board device[9] could generate a Trap PDU with the GPS position at an interval specified within the data structure for the GPS "managed object". The purpose of this reporting would be to track a vehicle in real-time. Therefore acknowledgements from the Monitor arc superfluous since the sender has no reason to re-transmit GPS positions that become immediately stale.

[9] The SNMP specifications for agent software architecture call this the Notification Originator Application. The peer software in the manager entity is called the Notification Receiver Application.

The Inform PDU, which requires acknowledgements, is the mechanism that is used more commonly in ATP to send a synchronous event report from the vehicle. These events can correspond to:

Regulatory exceptions (e.g. emissions-related events requiring intervention)

Maintenance exceptions (e.g. fault conditions requiring immediate inspection/validation/repair)

Operational exceptions (e.g. use of the vehicle in an unauthorized manner)

Since an acknowledgement is required for this PDU, the on-board monitoring agent has a means of determining whether the event report has been logged in a database[10].

[10] It is the responsibility of the Notification Receiver Application to ensure that these reports are committed to a database before the acknowledgment PDU is returned to the agent.

The Set PDU is used to remotely change the operating parameters of the on-board device. This could be, for instance, the threshold level at which a regulatory exception occurs or the interval of unsolicited GPS position reports (for a tracking application with Trap PDU's).

MIB Hierarchy and DIB Derivation—

Figure 9:
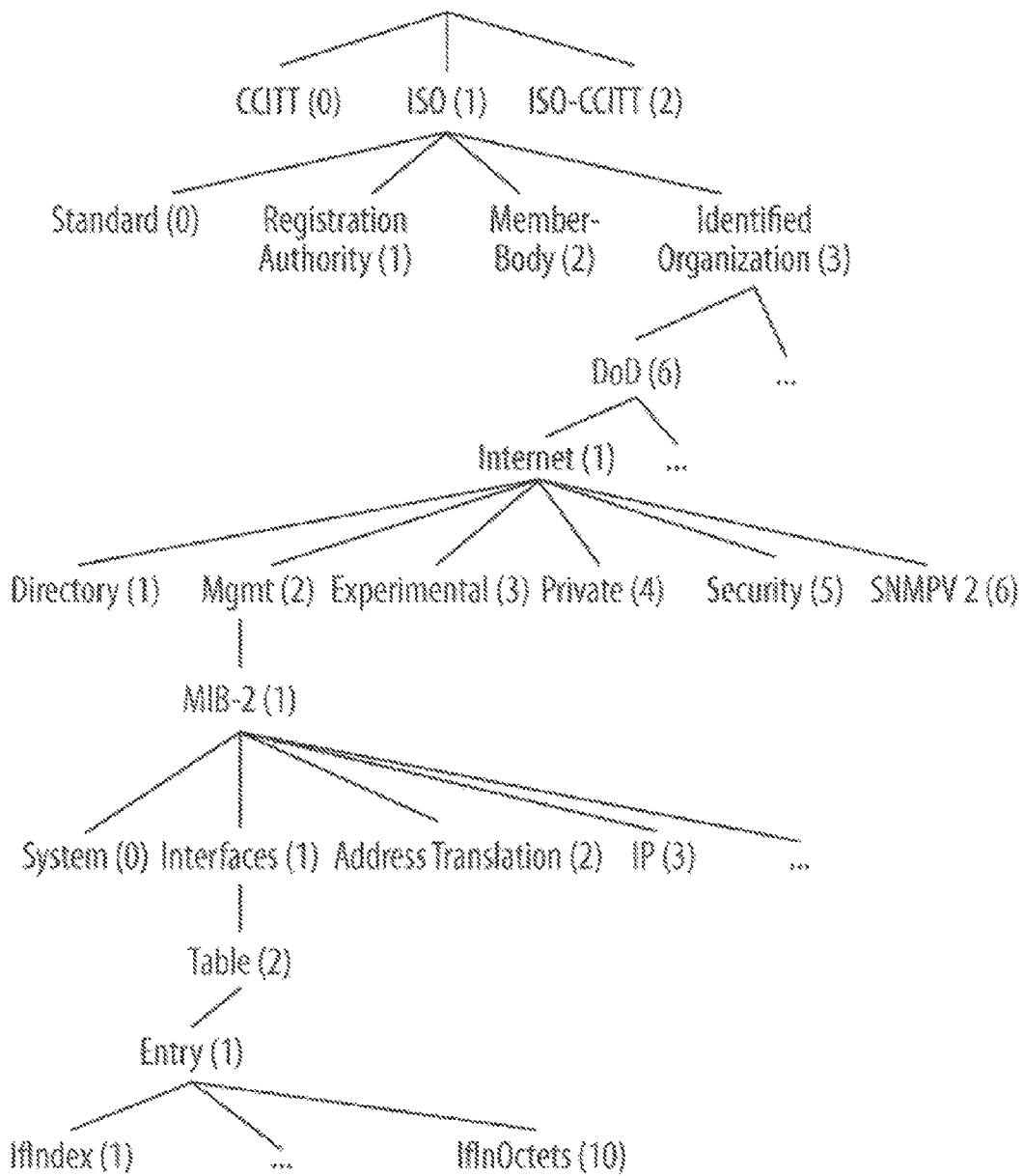
FIG. 9 is a schematic view of an MIB hierarchy for SNMP.

The MIB to which SNMP provides access is a collection of managed objects which are organized hierarchically, as shown in FIG. 9. A managed object[11] is one of any number of specific characteristics of a managed device. Managed objects arc comprised of one or more object instances, which are essentially variables.

[11] The terms MIB object, object, or simply MIB, are used interchangeably with the term managed object.

FIG. 9 illustrates the MIB hierarchy as a tree, the levels of which are assigned by different organizations. An object identifier (OD) uniquely identifies a managed object in this hierarchy. The top-level OID's belong to different standards organizations, while lower-level OID's are allocated by associated organizations. The OID is formed from the sequence of numbers corresponding to the nodes through which a managed object can be reached from the root of the tree. For example, the sequence:

1 3 6 1 2 identifies the MIB-2 object, which is the MIB for entities that comply with the specifications of the TCP/IP protocol stack. The full object name is:

iso.identified-organization.dod.internet.mgmt.mib-2

Figure 10:
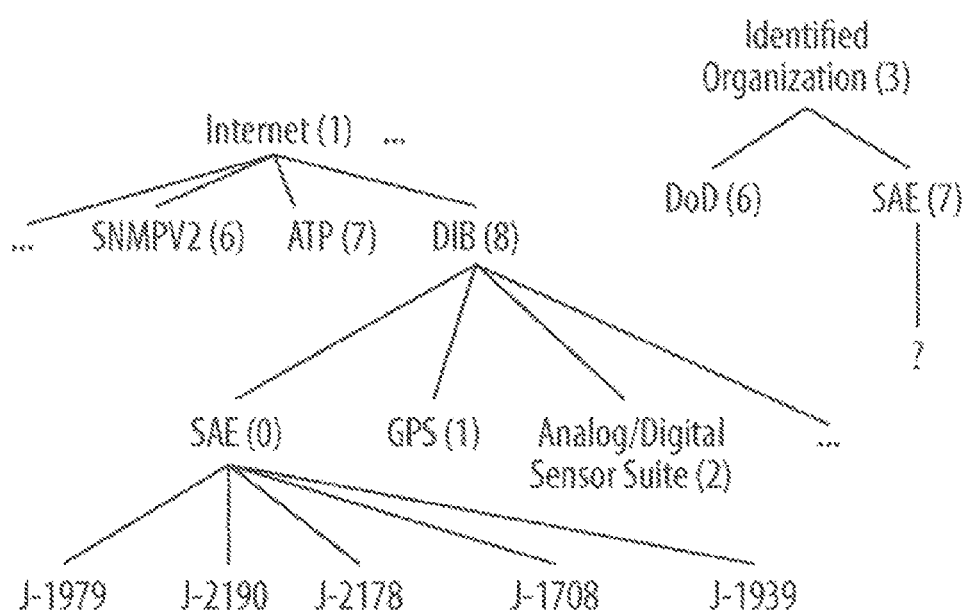
FIG. 10 is a schematic view of a portion of a DIB hierarchy.

Suppose that this MIB is maintained on a remote router with interfaces to several networks. The objects representing these interfaces are maintained in a table, each of whose entries is a collection of variables associated with network interfaces. Suppose, for instance, that an SNMP manager wanted to retrieve the number of octets received (since the last start-up) on the first network interface. The OID identifying this object would be:

1 3 6 1 2 1 2 1 10 and the object name would be iso.identified-organization.dod.internet.mgmt.mib-2.interfaces.iftable.ifentry-1.ifoetets A similar arrangement is contemplated for the hierarchy of the Diagnostic Information Base. The question that arises is whether a DIB sub-tree should branch out from the Internet node or whether an SAE sub-tree should branch out from the Identified Organization. It is evident that these two options would appear as shown in FIG. 10. The illustration makes the root of the new sub-tree should be the DIB node. Furthermore, since ATP is a (proposed) protocol which operates at the same level as SNMP within the Internet suite of protocols, it is also clear that the DIB should exist with the sub-tree starting at the Internet node.

It is not evident how the DIB could exist within a sub-tree with its root at the SAE node, without a duplication of the Internet node. This would be a violation of the rule that any node on the hierarchy can be uniquely identified. Therefore, it would appear to be more logical that the new sub-tree originates at the ATP node.

As mentioned previously, the OID's in the variable binding of ATP PDU's are encoded in a fixed length of two bytes. This means that the entire parent hierarchy of the object is not included to which the OID refers. The prefix 1 3 6 1 2 8 corresponding to the object name iso.identified-organization.dod.internet.mgmt.dib is an implicit part of each OID. Only the portion below the DIB node is serialized and transmitted over the network.

User Configuration—

At the highest level of the protocol stack, there can be some form of user interface allowing the installer (or eventually the driver) to specify which sources of internal vehicular data should be accessible to which remote "clients". The next section explains how the identity of any remote client can be completely authenticated and how the subsequent data exchange between client and (vehicular) server can be made secure against any eavesdroppers.

Security—

With ATP, the agent should have the authority to accept or reject requests from the monitor, based on the nature of the request and the identity of the monitor. For instance, a request from a remote monitor to report the current GPS location may be considered an invasion of privacy if it originates from a location not controlled by the vehicle owner. Similarly, a request for OBD information (SAE J-1979) could also be rejected, unless it originates from the monitor(s) authorized according to the User Configuration.

In order to meet these requirements, the communications link between the mobile agent and the monitor must provide both for privacy and authentication of the requesting entity; i.e. the monitor. An ideal framework for this is the Secure Socket Layer (SSL) protocol. SSL was developed by Netscape and has become the de-facto standard for interoperable security between clients and servers in the Internet and particularly for Web-based E-commerce[12]. SSL defines a handshaking protocol allowing for authentication of either party by the other using public-key encryption methods which are effectively unbreakable.

[12] See the specification in [4].

Normally, SSL operates on top of TCP/IP, which constitutes the underlying transport mechanism for Web traffic. However, because of the nature of the telemetry application, ATP uses the UDP/IP stack. The lower edge of the SSL record layer must therefore be adapted to interface to the UDP transport mechanism.

Figure 11:
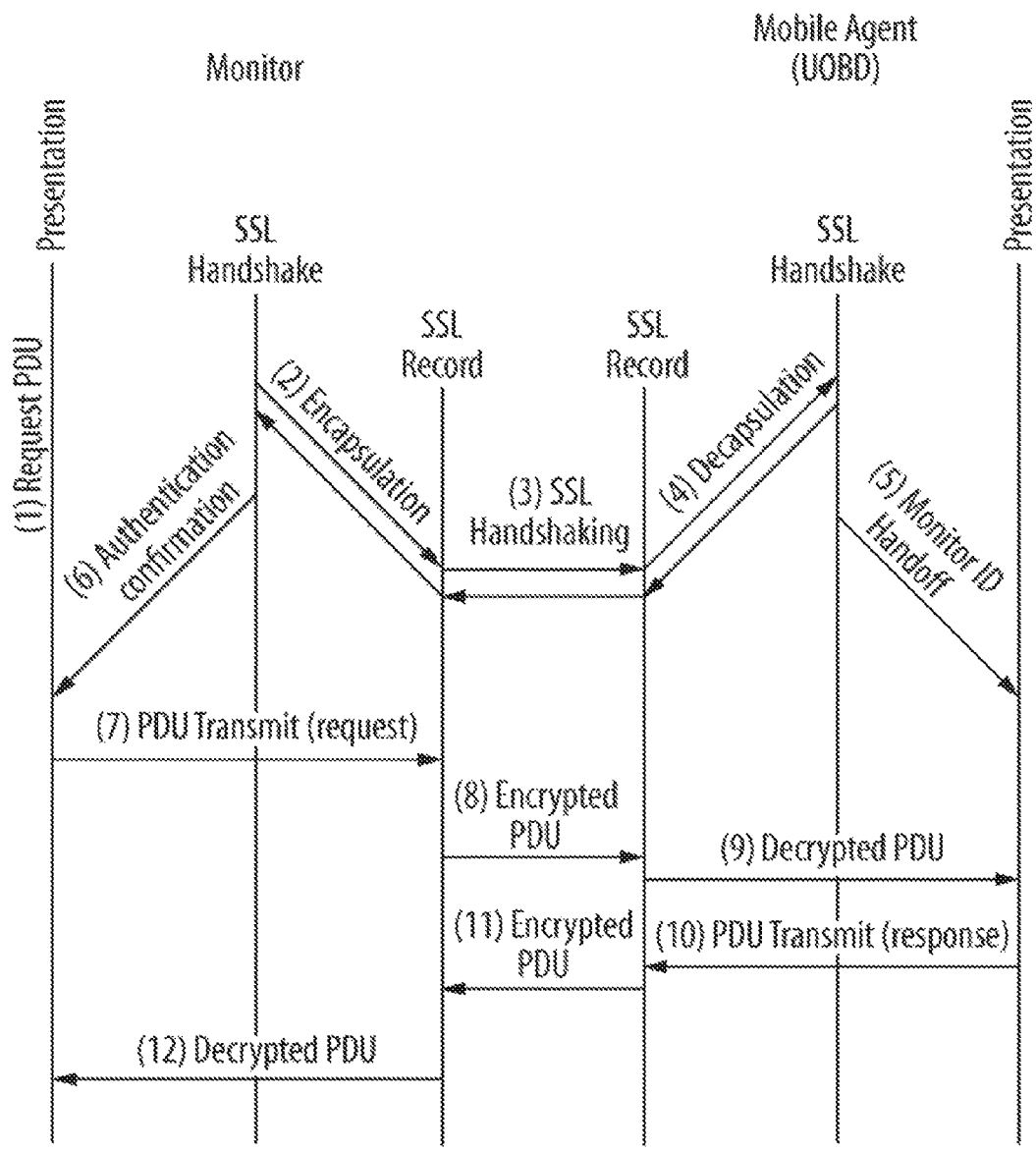
FIG. 11 is a schematic view of a message sequence.

FIG. 11 shows the security mechanism of SSL introduced between the ATP layer and the presentation layer, where the Protocol Data Unit (PDU) is parsed into individual requests for specific sources of data. The security layer acts as an effective "firewall" against unauthorized intruders, It authenticates the remote monitor and maintains privacy for the contents of the subsequent PDU's that arc exchanged across the session. The interface between the SSL handshaking protocol and the presentation layer should provide a mechanism for SSL to precede the announcement of a received PDU with an identification of an authenticated monitor requesting information.

This mechanism, as well as the subsequent data exchange, is illustrated by the sequence in FIG. 11.

The individual steps of this sequence can be described as follows:

1. The Monitor's presentation layer notifies its security layer that it wants to issue a request to the Mobile Agent.

The SSL Handshaking must now take place between client (Monitor) and server (Mobile Agent).

2. The SSL handshake layer asks the SSL Record Layer to encapsulate the requisite handshake message.

3. The SSL Record Layer sends an asymmetrically encrypted message (public key cryptography) to the other side.

4. The SSL Record Layer delivers a decrypted message to the SSL Handshake layer.

Steps 2-4 arc repeated in both directions until the authentication of the client has been established.

5. Once the Monitor has been authenticated, SSL reports its identity to the presentation layer, so that subsequent requests for information can be accepted or rejected according to the User Configuration.

6. The security layer on the Monitor side reports to the presentation layer that the authentication has been confirmed.

7. The Monitor's presentation layer sends the PDU to the security layer for session privacy encryption. The encryption is carried out with a symmetrical one-time key exchanged between the parties during the SSL handshaking (and which ensures the privacy of the exchange).

8. The encrypted PDU is "transmitted" to the Mobile Agent. In other words, it is passed on down through the Session Layer of the Monitor's protocol stack.

9. When the encrypted PDU arrives at the SSL Record Layer of the Mobile Agent, it is decrypted before being handed-off to the Presentation Layer.

10. The response from the Presentation Layer is sent to the SSL Record Layer. This response may be:
   data requested by the monitor
   a confirmation that a command sent by the Monitor has been executed, or
   a rejection of either a command or a request for data because the Monitor does not have the requisite authority for the request or command.

11. The SSL Record Layer encrypts the response with the symmetrical session key and transmits back to the Monitor (i.e. through the protocol stack starting with the Mobile Agent's Session Layer.

12. The Monitor's SSL Record Layer decrypts the PDU and hands it off to the Presentation Layer.

Note that all or part of this sequence could be carried out in the reverse direction. Suppose that the Monitor represents an emissions control regulatory agency and that a Mobile Agent receives a request every year from this Monitor to report all non-compliance events. The Mobile Agent may respond with a positive acknowledgement at the presentation layer, i.e. an acceptance of the request. For the rest of the following 365-day period, all exception conditions will cause the Mobile Agent to initiate communications to report these conditions. The request will therefore emanate from the Mobile Agent whereas the response from the Monitor will indicate that the exception report has been noted and logged to permanent storage. (The U-OBD can be configured to keep these exception reports in Flash memory until an acknowledgement is received from the Monitor. This ensures that exceptions that occur while the vehicle is not within coverage range are not "forgotten").

Vehicle-to-Vehicle Telemetry—Ad Hoc Networking with Wireless LAN's—

Figure 12:
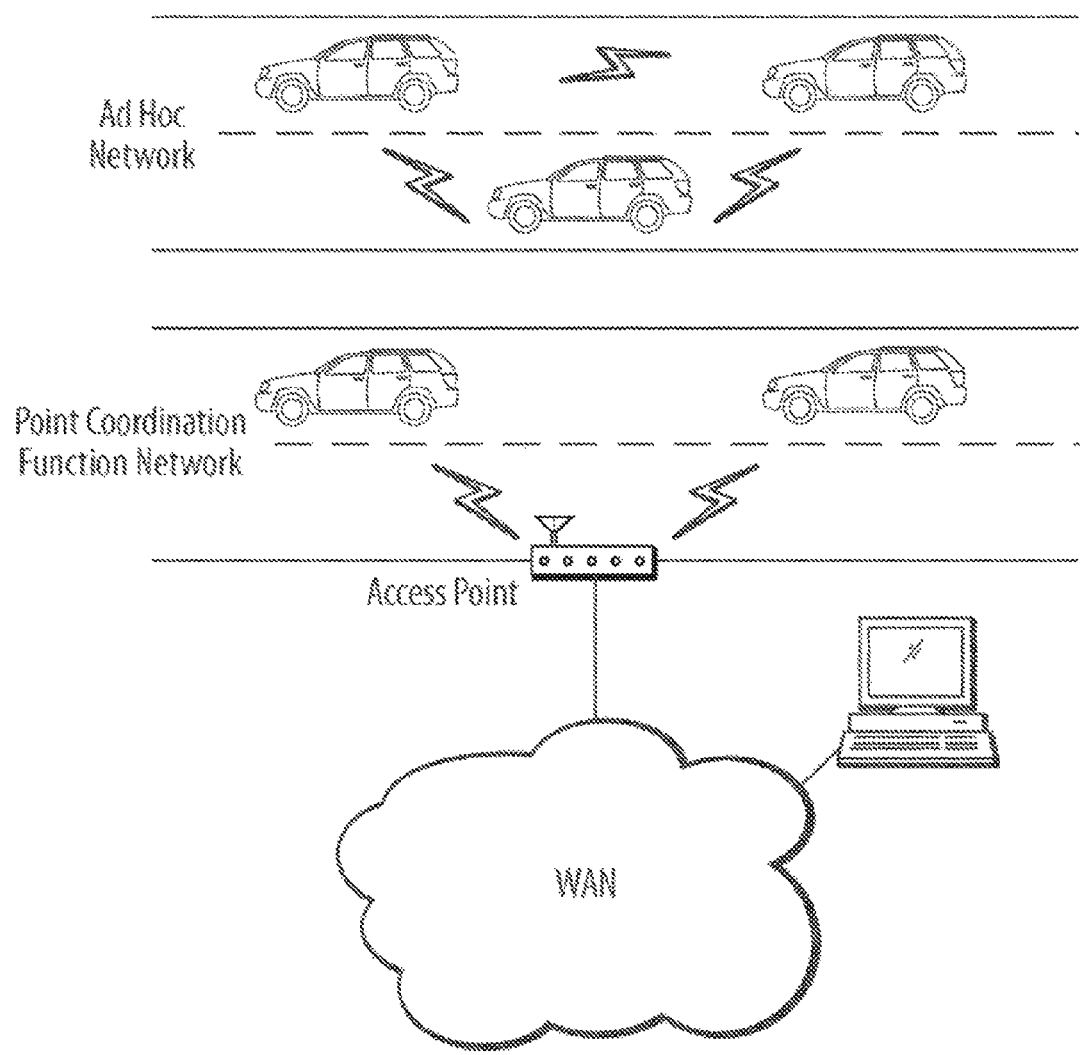
FIG. 12 is a schematic view of a network.

OBD-III is an example of telemetry consisting of a mobile server and a fixed-location client. Also envisioned is the case of a client-server relationship between two mobile vehicles. A data link between two vehicles can be established using the ad-hoc networking capability of the IEEE 802.11 specification for wireless LAN. Ad-hoc networks in wireless LAN's are created without a central coordinating node, called an access point. FIG. 12 illustrates the distinction between an ad-hoc wireless LAN and one with an access point.

By using different spread spectrum channels, both types of networks can co-exist on the same hardware platform, The access point provides the vehicle with connectivity to a Wide Area Network (i.e. the Internet) but is not required for an ad hoc network. The ad hoc network enables vehicles to establish logical links with their neighbors, which can be used to exchange critical operational information between vehicles.

Ad hoc networks can be created using a scheme embodied herein that permits each vehicle to maintain a real-time image of its "neighborhood". This neighborhood can include vehicles up to five hundred yards in both the forward and rear directions. The image maintained within each vehicle changes dynamically with changes in the surrounding conditions.

Figure 13:
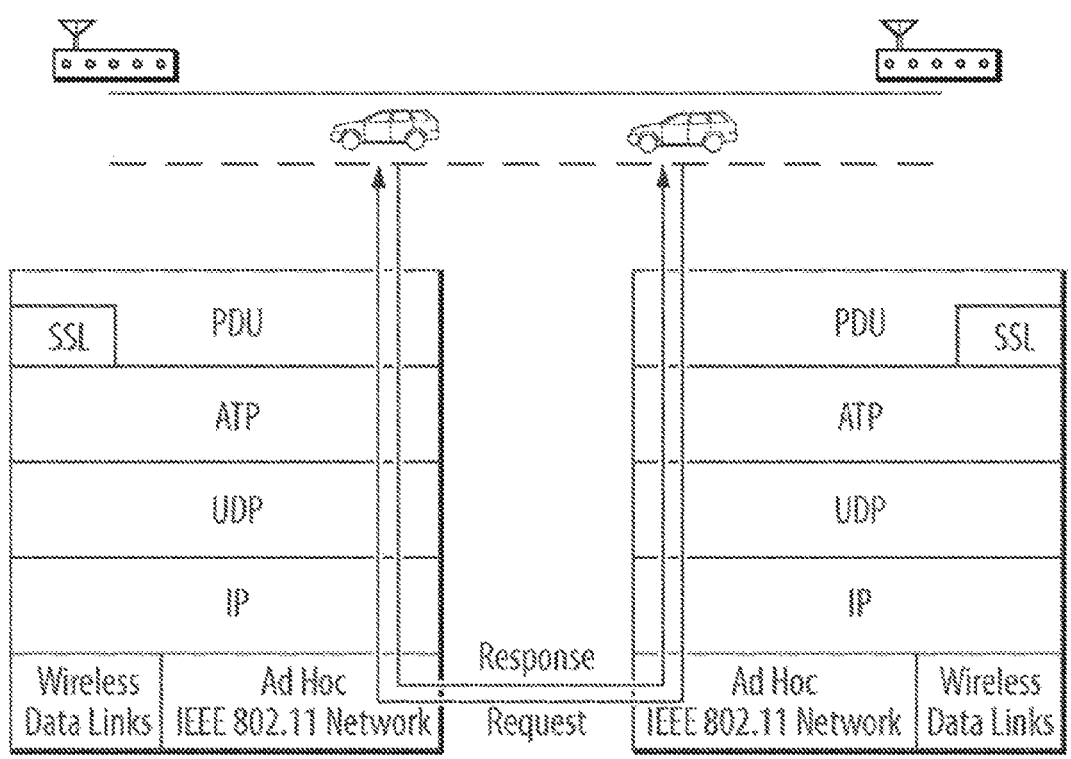
FIG. 13 is a schematic view of a protocol stack for exchanging data using the network of FIG. 12.

The ATP protocol stack can be used for vehicle-to-vehicle messaging in almost the same manner as it is used to interact with remote diagnostic clients. The difference is that security restrictions cannot apply in this case since all vehicles must necessarily and freely exchange information. This is illustrated in FIG. 13.

Applications: Safety vs. Congestion Management—

Vehicle-to-vehicle communications have been used on an experimental basis in the context of "platooning" for Intelligent Transport Systems (ITS). Platooning is simply one example of what is referred to herein below as "cluster intelligence" on the road. A cluster is the aggregation of vehicles within a neighborhood. Since the neighborhood of any vehicle constitutes a fluid network topology surrounding it, the membership of the associated cluster is dynamic.

The exchange (or the broadcasting) of information within a cluster has value in terms of both road safety as well as traffic management aimed at reducing congestion. In some respects, there is an artificial distinction between these areas. Better traffic management should result in better safety and vice versa. The descriptions of the following application areas do not distinguish between these two purposes.

Redundancy—

Vehicle on-board systems such as cruise control or cockpit electronic information systems can benefit from a variety of inputs, including forward collision avoidance radar as well as vehicle-to-vehicle information exchange facilitated by ATP with ad hoc networking.

Ad hoc networking is therefore seen as providing a supplementary set of inputs/services to control/information systems. In some instances, these inputs/services may be complementary to one another whereas in other instances they would overlap. For instance, in the case where vehicles are IEEE 802.11-enabled, radar can complement ad hoc networking by providing neighbor information for immediate adjacent vehicles. Of course, if these vehicles are also IEEE 802.11-enabled, this functionality overlaps that of radar. This provides a degree of redundancy that can only be beneficial to the objective of enhanced safety, particularly since the marginal cost of providing services based on IEEE 802.11 is insignificant[13].

[13] Assuming that the vehicle is IEEE 802.11-enabled for Wide Area Networking purposes.

The increasing use of mobile data communications for remote on-board data acquisition has given rise to a need for a standard architecture enabling interoperability of modules participating in vehicular telemetry across wide area networks. The application with the greatest potential for widespread use is wireless On Board Diagnostics (OBD-III), but there is a number of other applications, including vehicle maintenance and tracking. The paradigm of communications network management, where nodes such as bridges and routers can be remotely diagnosed by a management entity, provides an appropriate model for remote vehicular diagnostics. The specifications of the Simple Network Management Protocol (SNMP) are therefore used in novel and unexpected ways as a basis for deriving an Automotive Telemetry Protocol (ATP). ATP operates in an open Internet environment that enables client-server relationships between on-board diagnostic "agents" and "monitors" located anywhere in the network. The SSL protocol is layered above this to provide security. The same protocol architecture, minus the security, can be layered on top of IEEE 802.11-based ad hoc networks for application in intelligent transport systems (ITS).

Network Neighbourhood

Figure 14:
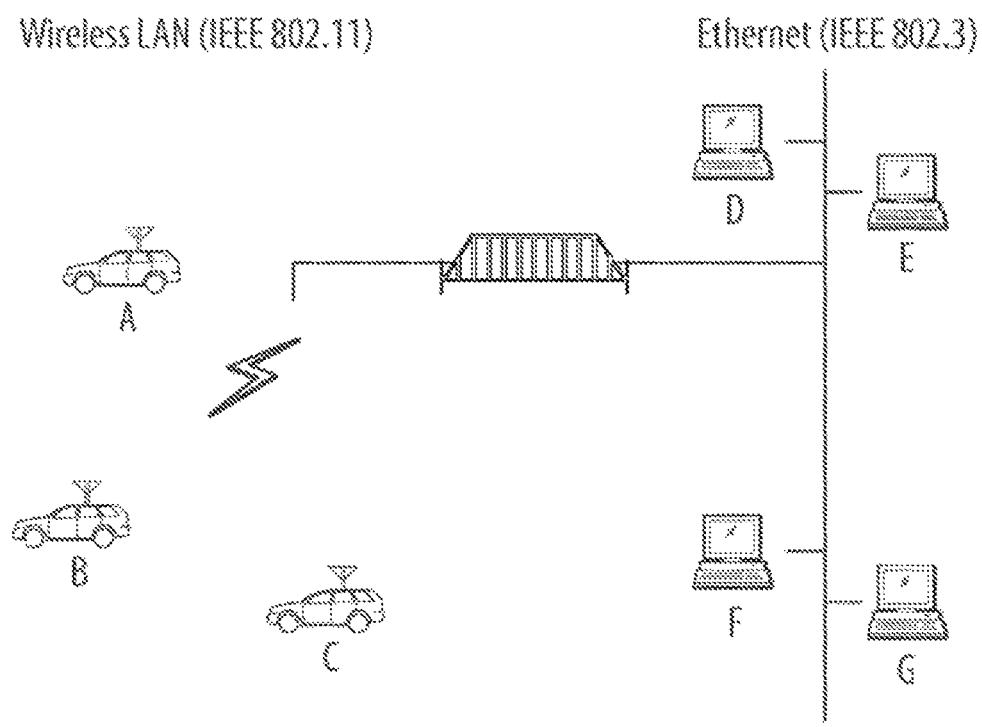
FIG. 14 is a schematic view of another network.

The concept of a network neighbourhood has been borrowed as it is used in the topological sense to characterize adjacent nodes on a data link. If node A can reach (transmit to) node B without traversing a communications bridge, then A and B are said to be in the same neighbourhood. This is illustrated in FIG. 14, which depicts two data links connected via a bridge. The data link on the right is defined by the IEEE 802.3 (Ethernet) specification, which is commonly used for wired Local Area Networks (LAN). The data link on the left is specified by IEEE 802.11 which is wireless LAN. As shown in FIG. 14, A, B and C are neighbours on the wireless LAN, whereas D, E, F and G are neighbours on the wired LAN. Although this is not clearly shown in FIG. 14, the neighbourhoods of both the wireless and wired LAN's are defined by topological relationships between the nodes, not by physical distance. If two nodes share the same medium and the quality of the signals between them is acceptable (in terms of error levels), then they are topologically in the same neighbourhood or adjacent.

In the case of an intelligent highway network neighbourhood, an additional geographic criterion can be added, if desired, to the determination of adjacency, By comparing GPS position reports of other nodes on the data link with its own GPS position, each node can filter out other nodes which are outside of a specified geographical threshold and therefore not relevant to the operation of the vehicle.

The foregoing description allows up to put forward a definition of an ITS Wi-Fi neighbourhood, from the perspective of a single node.

An ITS Wi-Fi neighbourhood is a collection of surrounding IEEE 802.11 nodes, sharing a common physical medium (i.e. a specified direct sequence spread spectrum channel) as well as the timing parameters for medium access control, and within a relative geographic position that is significant to the safe operation of a vehicle on any type of public roadway.

Registration on the Network

The IEEE 802.11 specification defines timing parameters that are used in conjunction with a timing synchronization function to coordinate access to the medium; i.e. to minimize contention for the channel and to reduce the possibility of collisions. Nodes cannot use the medium to transport data until they have received the appropriate "registration" frames from nodes that are already part of the network. Registration frames contain the information needed to correctly operate on the medium, including a time stamp allowing the new entry to synchronize with the existing nodes.

In 802.11, the method used to coordinate access to the medium is called Carrier Sense Multiple Access with Collision Avoidance (CSMA/CA) which is similar to the method used in 802.3 (Ethernet). It is based on the idea of "sniffing" the channel for a carrier prior to transmission. If the medium is busy, the node with data to send enters a randomly-computed waiting period before retrying, which minimizes the likelihood of simultaneous retries by multiple nodes waiting for the channel (and the resulting "gridlock" that this would create).

The 802.11 specification calls this a distributed coordination function (DCF). It also defines a contention-free mechanism which is called point coordination function (PCF). Whereas DCF is the default mode of operation, PCF has been made available to handle special scenarios, as in the case of time-critical traffic such as audio and video. Typically PCF is provided through a fixed access point, which, in the case of ITS, would take the form of a roadside base station.

Vehicles wishing to have access to the Internet will register with roadside access points using the channel(s) allocated for this application[14]. The performance criteria for streaming audio and video, or for VOW (Voice Over IP), may require the PCF method of channel management. However, the ad hoc network of vehicles sharing the same neighbourhood will use DCF to manage its channel(s). Since DCF docs not rely on the presence of a "master" station to coordinate access to the medium, the ad hoc network does not require a roadside infrastructure in order to function properly.

[14] See the section entitled Wi-Fi Channel Selection for a discussion of the distribution of channels between ITS and Internet functions.

This does not preclude the use of a roadside infrastructure. Even if Internet access and other services are optional, base stations may still be required for a variety of ancillary ITS functions, including differential GPS beacons, geographic orientation with respect to the highway system[15], electronic toll collection, electronic road signage and travel information.

[15] See Wi-Fi Channel Selection.

The registration mechanism itself can be operated in either a passive or an active mode. Both of these methods are described below.

Passive Registration

Figure 15:
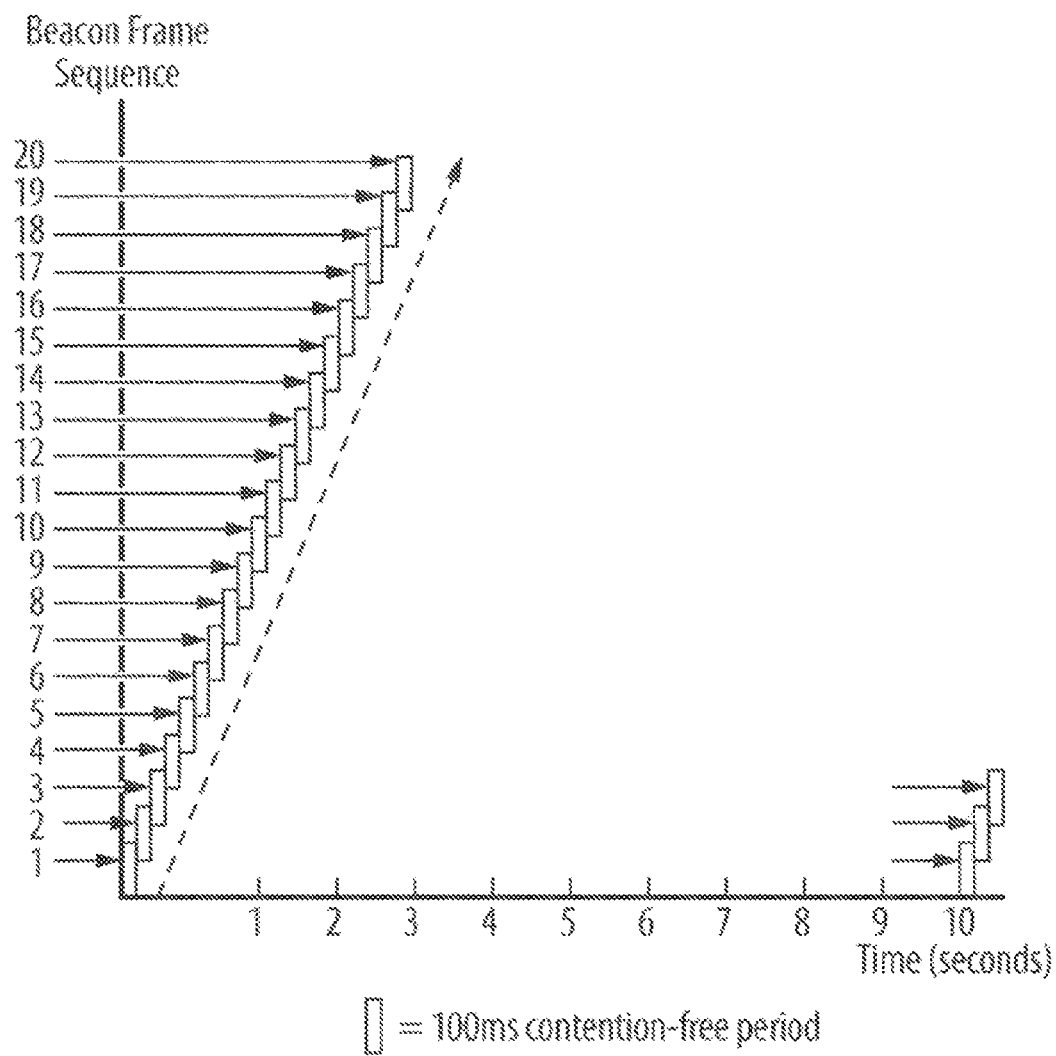
FIG. 15 is a time plot of beacon frame sequence.

In the passive mode, a candidate node listens for a beacon frame from an existing node. In ad hoc networks, all existing nodes transmit beacon frames periodically, allowing nodes entering the network to synchronize with the existing nodes for channel management. A beacon frame signals the start of a contention-free period, during which all other nodes in the neighbourhood defer transmissions so that new nodes wishing to announce their presence can do so. Both the interval between beacon frames and the subsequent contention-free period arc configurable parameters that arc typically set in the ranges of 1-2 seconds, and 100 ms-0.5 seconds, respectively. However, as will be seen in the next section, there may be several hundred vehicles in the same neighbourhood, particularly in congested highway conditions, which would render these settings impossible. Increasing the interval between beacon frames is only part of the solution. FIG. 15 illustrates that if every one of 100 vehicles were to transmit beacon frames at intervals of 10 seconds, each announcing the start of a 100 ms contention-free period, there would be no time left during the 10 second period to transmit any user data.

The complete solution lies in the fact that the ITS ad hoc network nodes do not need to negotiate any of the logical management functions of association and authentication, specified in the medium access control (MAC) layer of 802.1 1. Association is the mechanism whereby one node requests explicit recognition from another node. In an infrastructure network, requests arc sent to an access point, which stores the address of the requesting node in a local table and sends a response frame. The address table maintained by the access point controls whether packets destined for specific addresses arc actually transmitted. If no association has been established for an address, no user data will be sent to it.

However, as explained in the section entitled Neighbour Discovery, most of the user data in the ITS ad hoc network is sent to the broadcast address (i.e. to all nodes), for which no association is required. There are some applications in which associations with surrounding vehicles arc required but these would be only with the physically adjacent vehicles. Each node should only negotiate associations with neighbours inside a prescribed boundary wherein the driving manoeuvres of those neighbours are significant enough to warrant unicast messages (i.e. addressed to specific destination node). Since each node will receive a far greater number of beacon frames from neighbours with which it does not need associations, the contention-free periods following these beacon frames will be essentially wasted. In order to preserve bandwidth, the contention-free period should be reduced to a minimum allowable value (say, 1 ms) and the negotiation of associations should be triggered not by the reception of beacon frames, but by conditions determined through the Discovery process, which is described in the next section.

Authentication is the process whereby the requesting node is granted permission to communicate using a symmetrical encryption key. In the ITS ad hoc network, authentication is not only not required, it is anti-thetical to the concept of vehicle platooning or "cluster intelligence" because all parties must necessarily and freely exchange information without restriction.

Active Registration

The active registration method enables the candidate node to send probe frames, which are essentially "ping" requests for some other node to respond. In the ad hoc network topology, probes must be broadcast to all listeners, as there is no single node that can be relied upon to always be present (i.e. fixed access point). The IEEE 802.11 rule is that the response to a probe is sent by the node which transmitted the most recent beacon frame.

The facility of active registration enables us to minimize the use of bandwidth by the transmission of beacon frames. Suppose the interval between beacon frames is configured to 60 seconds. With a contention-free period of only 1 ms after each beacon frame, a platoon of 5 vehicles would use roughly 0.01% of the available time for beacon frame broadcasts, and a platoon of 500 vehicles would use only 1%.

Figure 16A:
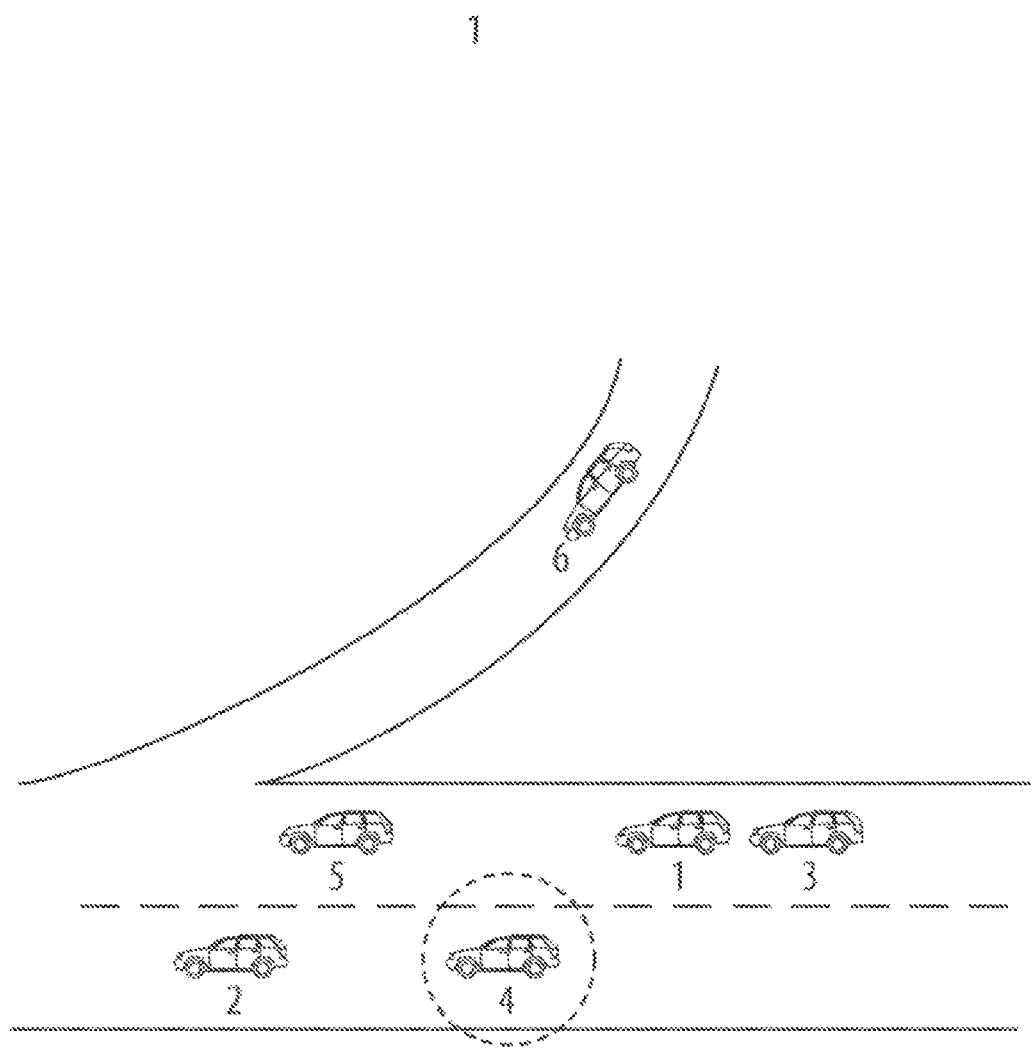
FIG. 16a is a schematic view of a portion of an adhoc network.
Figure 16B:
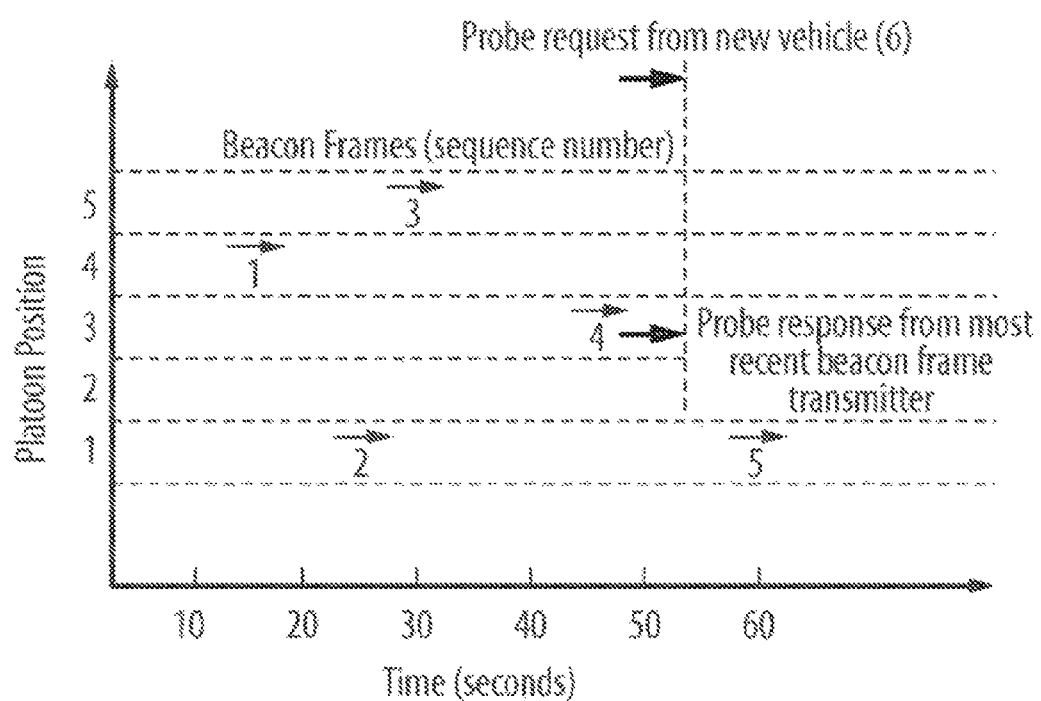

The scenario with 5 vehicles is shown in FIGS. 16a and 16b. The average time between beacon frames is 12 seconds. Each vehicle in the platoon is numbered according to its sequence position for transmitting beacon frames. Vehicle 6, entering on the access ramp, begins transmitting probe request frames after vehicle 4 transmits its beacon frame, in order to discover a new ad hoc network[16]. Vehicle 4 responds almost immediately with a probe response[17].

[16] The new vehicle entering the expressway must know when to try to switch to a new ad hoc network. As discussed in Wi-Fi Channel Selection, specific channels are allocated to vehicular flows on divided highways based on heading. We assume that vehicles are not equipped with accurate digital maps and therefore not able to use GPS to determine whether they are entering divided highways. It is therefore necessary to adopt the rule that when the "forward" region of a vehicle's neighborhood suddenly becomes "depopulated", the vehicle must begin broadcasting probe frames on all appropriate channels until it receives a response from a vehicle with a matching heading. See the section entitled Changing Neighborhoods.

[17] Probe response frames must contend for the channel with Neighbor Discovery and other user traffic. See the sections below.

Neighbour Discovery

The neighbor discovery mechanism is comparable to the concept of neighbor discovery protocols used for routing data traffic in network environments with dynamic topologies. The method is based on unsolicited neighbor advertisements that incorporate, as explained previously, a geographic component. These are periodic messages that each node broadcasts containing its GPS information, including latitude, longitude, speed and heading[18].

[18] Elevation may also be required. This would enable receiving vehicles to distinguish vehicles on elevated expressways from those at grade level.

Figure 17:
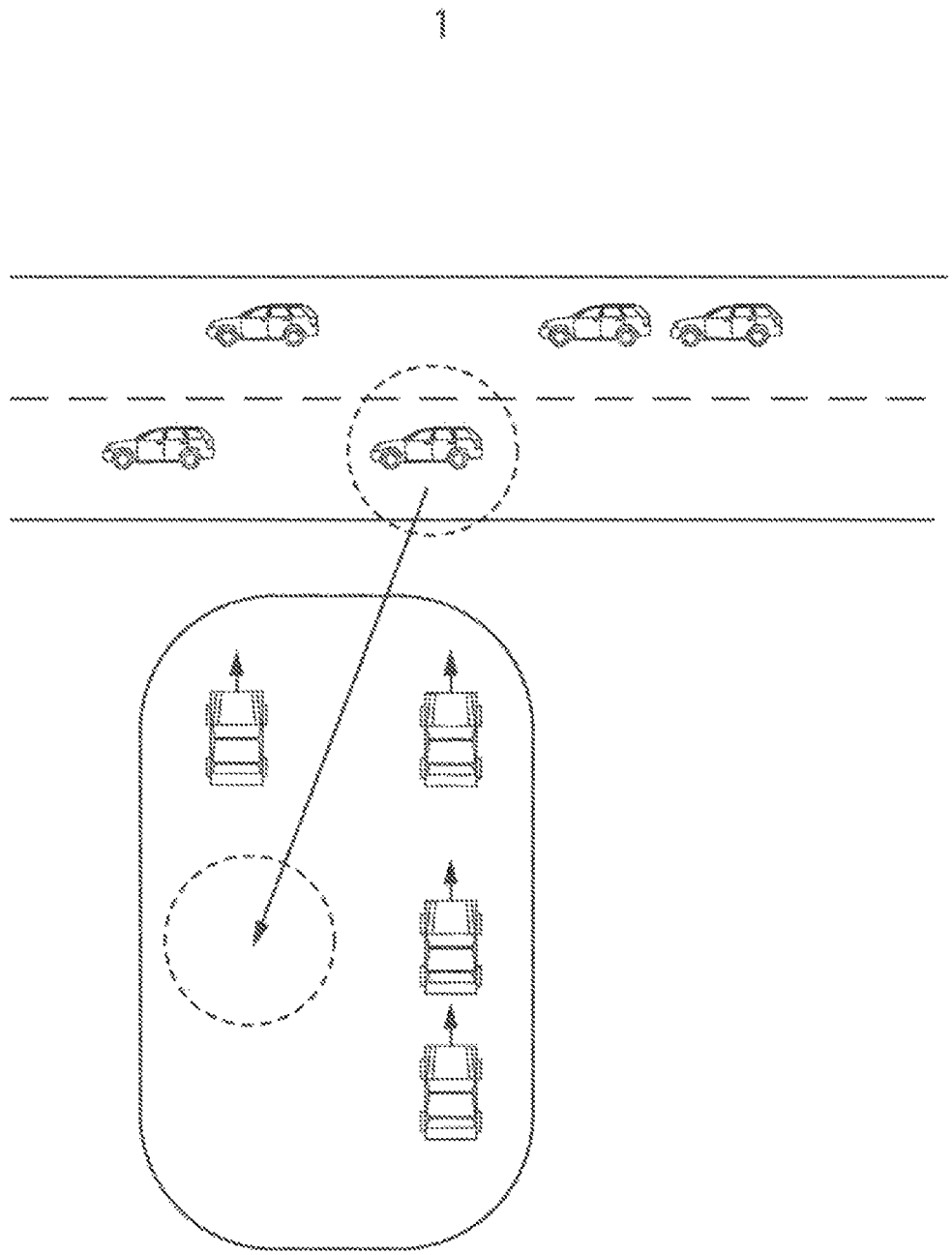
FIG. 17 is a schematic view of another ad hoc network

The neighbour advertisements are used by each node in the ad hoc network to establish an "image", in memory, of the current configuration of the neighbourhood. FIG. 17 illustrates this concept, showing the neighbourhood image formed by the second vehicle in the passing lane.

The time interval between broadcasts, called the discovery cycle, must be frequent enough to maintain a picture of the neighbourhood that is accurate in terms of the relative position of each neighbour. The accuracy of GPS reports, in terms of the relative location of two nodes in geographic proximity to one another, is much higher than the accuracy of absolute GPS reports, since the error inherent in the processing of the satellite signals should affect all nodes equally. Therefore, the relative position of each node with respect to the other should, theoretically, contain essentially no error, enabling vehicles to judge the distances between them with a level of precision that is effective for the tasks of collision avoidance and platooning. For instance, the position of a vehicle travelling at 70 mph changes by more than 100 ft/sec. This would suggest a requirement for several updates per second in order to maintain accuracy. However, the frequency of updates is constrained by the amount of data traffic that is generated during the discovery cycle, in order to avoid channel contention. This, in turn, is a function of the number of vehicles that are within RF range, i.e. the neighborhood population.

It should be recognized, however, that there is a circular relationship between all of these variables. The neighbourhood population is a function of the average speed of the surrounding vehicles. The greater the speed, the smaller the neighbourhood population; therefore the smaller the amount of data traffic in the discovery cycle which allows for a greater frequency of updates.

This can be illustrated by example. At 70 mph, the safe stopping distance is roughly 200 feet. Assuming all vehicles respect the recommended stopping distance[19], a maximum RF range of 3000 ft[20] and a maximum of four lanes in the same direction[21], the surrounding neighbourhood can contain a maximum of 60 vehicles.

[19] This is, of course, one of the ultimate objectives of this technology.
[20] Based on a maximum range of 0.5 kilometers for each transmitter, each node can hear transmissions within this radius. The "width" of the neighborhood is therefore 1 kilometer or approximately 3000 ft.
[21] Vehicles travelling in the opposite direction or in adjacent "collector" or "express" streams, do not transmit discovery frames on the same channel. See Wi-Fi Channel Selection.

Figure 18:
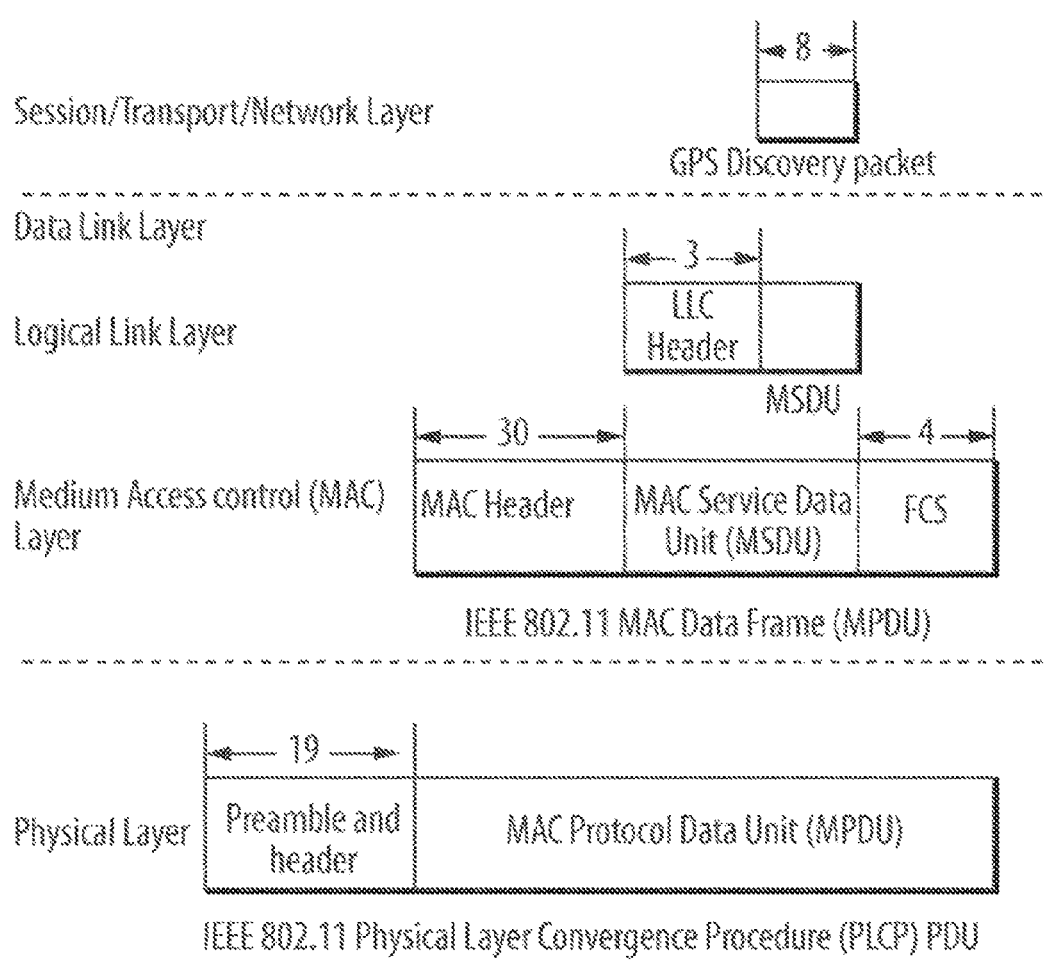
FIG. 18 is a schematic view of another protocol stack.

To determine the total amount of traffic that is transmitted over the spread spectrum channel, we must first establish the total size of each discovery packet. This is shown in FIG. 18, which describes the protocol stack from the physical to the session (ATP) layer. It is expected that all of the required user information above the data link layer (IEEE 802 Logical Link Control) can be compressed into 8 bytes. The result is a frame size, at the Physical Layer Convergence Procedure (PLCP) sublayer of 64 bytes. Therefore, the total amount of traffic in the discovery cycle is $$64 \times 60 = 3840 \text{ bytes or } 30{,}770 \text{ bits.}$$

At 11 Mbps[22], the data rate of the spread spectrum channel should be able to support several discovery cycles within an interval of one second, even allowing for some degradation of throughput due to channel contention with such a relatively large number of nodes.

[22] For reasons explained in Channel Selection, the data rate of channels using ad hoc networking would more likely be 2 Mbps, which is still expected to be sufficient for several discovery cycles per second.

In order to compensate for this change, the event queue of the "cluster intelligence" process should include a periodic timer that drives an update of the position of all vehicles in the neighbourhood, based on the speed and heading reported in their last broadcasts.

Filtering Neighbour Advertisements

Each node can limit the population of its neighbourhood such that only those neighbours that are close enough to have a potential impact on the safe operation of the vehicle are included. By filtering out node beyond this boundary, the size of the collections of neighbour "objects" in memory are restricted and the amount of processing necessary to periodically update any state variables belonging to these objects are limited.

Message Compression

It has been stated that the GPS discovery message can be compressed into 8 bytes. This is accomplished by incorporating only the least significant 2 bytes of both the latitude and longitude[23]. These 2 bytes represent the fractional part of the minutes portion of the reading. This is sufficient since one minute of latitude or longitude is greater than one mile, which is well beyond the maximum RF range of 0.5 kilometers. Therefore, a receiving node can easily reconstruct the GPS position of the transmitting node by substituting the degrees and minutes of its own GPS position for both latitude and longitude. It must also increment or decrement these values where appropriate near measurement boundaries. For instance, if a receiving node has latitude of 43 degrees and 56.9982 minutes, whereas the message received indicates a fractional value of 0.0053 minutes, the minutes value substituted should be 57 instead of 56.

[23] The size of this message increases to 10 bytes if elevation is included.

Figure 19:
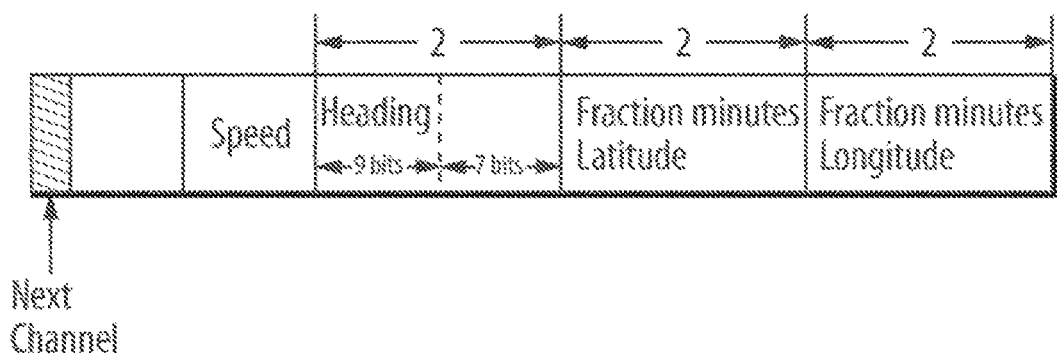
FIG. 19 is a schematic view of another protocol data unit.

FIG. 19 illustrates the format of the complete GPS discovery message. The speed is an integer value from 0 to 255 (one byte) and the heading is from 0-360 (9 bits) with 7 bits of fractional degrees. The leading byte indicates, in the most significant bits, the channel to be used by the sender for broadcast on the next discovery cycle. This is explained in the following section. The other bits of the leading byte are reserved for future use.

Wi-Fi Channel Selection[24]

[24] This section describes the use of the channels available under the specification for the unlicensed 2.4 GHz band. This specification is entitled IEEE 802.11(b). The use of the IEEE 802.11 MAC with other frequency bands, such as the 5.9 GHz band allocated by the FCC for intelligent highways, may prescribe different modulation and channelization techniques such that the number of channels available may be different. However, the notion of allocating the channels available to various IVHS functions would not change.

The 802.11 specification for mobile applications calls for at least 3 channels of direct sequence spreading (DSS) which can operate concurrently without interference. However, through software-based configuration of the transmitter, more channels can be obtained at lower data rates. For instance, by allocating a single 11 Mbps channel for high speed internet access, a larger number of at least six 2 Mbps channels can be obtained from the remaining bandwidth. This allows mobile nodes to separate ad hoc networking data traffic from infrastructure-based data traffic that uses roadside access points. Since there is no need for communications between vehicles on opposite sides of a median, it suffices for each node to monitor the channel used to broadcast discovery messages by all other nodes travelling in the same direction.

Figure 20:
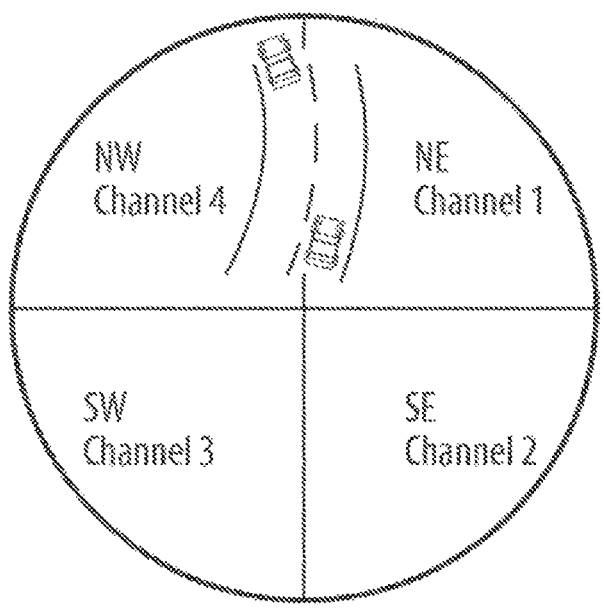
FIG. 20 is a schematic view of a quadrant divided highway segment.

In order to avoid unnecessary channel contention between vehicles travelling in opposite directions, the channel selection for discovery broadcasts can be determined on the basis of heading. A simple scheme would be to allocate 4 of the 10 channels for ad hoc networking and to divide the compass into four quadrants[25]. However, as FIG. 20 shows, this would not handle the case where a slight curvature of the roadway would result in a following vehicle listening to a channel on which the leading vehicle is no longer transmitting. This can be resolved by flagging the discovery message in a way that indicates to neighbours on what channel the next message will be transmitted.

[25] An additional channel should be allocated for use by all vehicles on non-divided highways and city streets.

In other words, when a vehicle detects that its heading has shifted into a different quadrant, it should not immediately begin transmitting on the corresponding channel. The next message is transmitted on the current channel but all listeners are advised of the channel that will be used on the subsequent message[26]. Only the following vehicle should switch to monitoring the new channel. It should also switch if it detects the heading change before it receives the change of channel flag from the vehicle ahead.

[26] Note also that the subsequent message cannot be transmitted until registration on the new channel has taken place using probe frames.

This vehicle enters a transitional phase where it may monitor a different channel than the one on which it transmits. During this period, the next following vehicle will receive messages only from neighbours transmitting on the "old" channel (i.e. prior to the curvature in the road). It will not receive any Discovery messages. More importantly, it will not receive any asynchronous event reports from several vehicles ahead in the platoon. In order to compensate for this, it needs to continuously scan both the "old" and the "new" channels until it receives a "next channel" flag from the vehicle ahead of it.

Changing Neighbourhoods

To establish the conditions under which a vehicle changes neighbourhoods, reference is made to the definition of an ITS Wi-Fi neighbourhood given earlier. The neighbourhood changes when there is a change in the shared medium. An example of such a change has already been described, when the roadway heading shifts to a new compass quadrant and there is a staged transition of the platoon to a new Wi-Fi channel.

In order to address this issue, the following question needs to be answered: how does a vehicle determine that it is entering an expressway without requiring the use of detailed digital maps? The solution is simple if the vehicle is following another one that is entering the expressway. It is the leading vehicle's problem! The following vehicle simply needs to monitor the current channel for a "next channel" flag from the leading vehicle. Of course, this is a facile solution since it shifts the problem to the leading vehicle and besides, it does not address the scenario where there is no leading vehicle that is currently within the neighbourhood.

The answer is provided by the mechanism for active network registration using probe frames. When a vehicle detects that it has no one ahead of it, it must begin to probe whichever of the four channels allocated to the quadrants of the compass in which the vehicle's current heading falls. Until it receives a response from some node on the new channel, it should continue to monitor the existing channel used for undivided highways and city roads. One of two possibilities will occur.

new neighbours are found (through the discovery mechanism on the existing channel). These could be moving either in the same or the oncoming direction. Or even in a transversal direction. Their locations preclude the possibility that the vehicle is on an access ramp to an expressway. In this case, the vehicle ceases the periodic probes.

a probe response is received on the new channel. The vehicle must prepare to switch channels and notify all its current neighbours that it is doing so by setting the "next channel" flag in its next discovery message.

This scenario is reversed in the case where a vehicle leaves a divided expressway.

Service Advertisements

There may be cases where specialized nodes may provide streams of information that would be costly, in terms of bandwidth, to broadcast in an unsolicited fashion. Instead, these nodes can advertise the availability of such services by periodically broadcasting a message notifying all listeners that the service is available upon request. Examples of this would be a digital video camera mounted on board a vehicle or on a traffic signalization light.

Applications

Safety vs. Congestion Management

The application of ad hoc networks to ITS tasks has value in terms of both road safety as well as traffic management aimed at reducing congestion. In some respects, there is an artificial distinction between these areas. Better traffic management should result in better safety and vice versa. The descriptions of the following application areas do not distinguish between these two purposes.

Event Notification

All nodes participating in an ad hoc ITS network are required to inform their neighbours of any operational events that may be significant to a neighbouring vehicle, such as acceleration, brake application, turn or lane change, etc. These events should be reported as asynchronous notifications sent to the broadcast address. In other words, any neighbour that is listening should receive a real-time notification of the event. For instance, application of the foot brake would be reported not only to the following vehicle behind but to every other vehicle in the following platoon. The reaction time to a brake light (if it is working) is typically in the range of 0.5 seconds. Therefore, if the vehicle at the head of a platoon of seven vehicles applies the foot brake, the vehicle at the end of the platoon could receive notification as much as 3 seconds before seeing the brake lights of the vehicle in front of it.

All asynchronous event notifications should be repeated up to n times, where n is a configurable parameter of the IEEE 802.11 MIB (Management Information Base). Repetition of event notifications will ensure that following neighbours required to listen to more than one channel (during the transition phase described in Wi-Fi Channel Selection) will have an opportunity to hear the message.

Intention Notification

The ad hoc network provides the means for vehicle-to-vehicle notification of intention with respect to driving maneouvres. A class of such notifications can be specified that require explicit acknowledgements from the receiver of the notification. (Acknowledged Connectionless Service of the LLC layer) These correspond to Set commands that can be issued through the use of an ATP client service. By acknowledging these notifications, the receiver informs the sender that it is "aware" of the sender's intentions. The state of knowledge of both parties can then become inputs to their respective control or cockpit electronic information systems.

Pass

Figure 21:
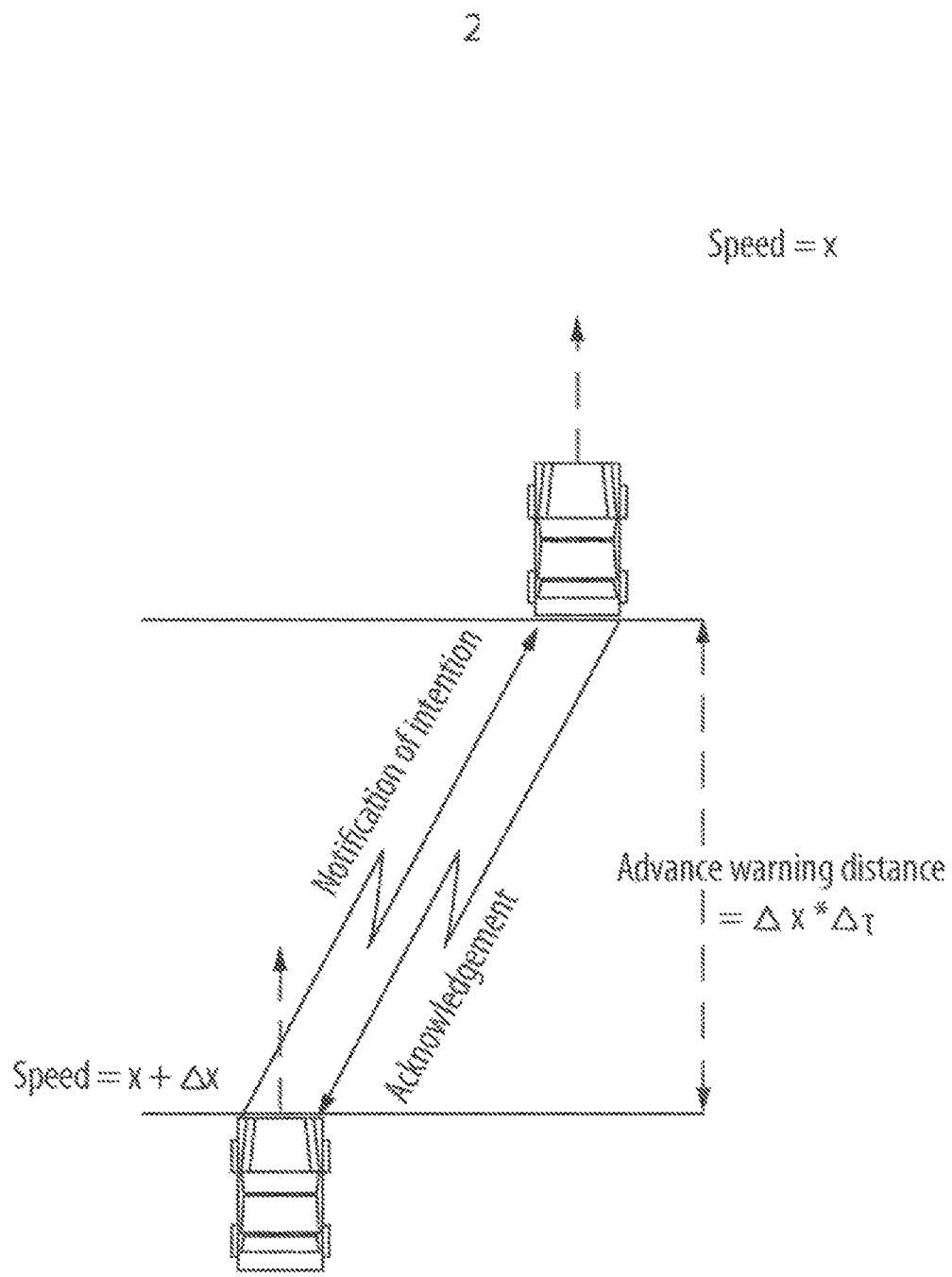
FIG. 21 is a schematic view of a data exchange during a driving maneuver.

FIG. 21 demonstrates an example of a driving maneouvre that can be assisted by ad hoc networking. The speed of vehicle A in the passing lane is greater than that of vehicle B in the slow lane. Assuming that the speed of B remains constant, A can determine how much time remains before it passes B, using its own speed and the neighborhood position of B. When the remaining time equals the time interval required for advance notification (Ax), A sends a unicast frame to B containing a notification of intention to pass on the left. If B responds with an acknowledgement, A is therefore able to provide the appropriate control or driver information system with a confirmation that the vehicle to be passed is "aware" of the intentions.

Lane Change

The intention to change lanes can be announced and acknowledged in a manner similar to the intention to pass. The vehicle preparing to change lanes issues its notification to the closest following vehicle in the lane to which it intends to change. Again, both parties are aware and prepared for the manoeuvre.

Merge/Yield

Figure 22:
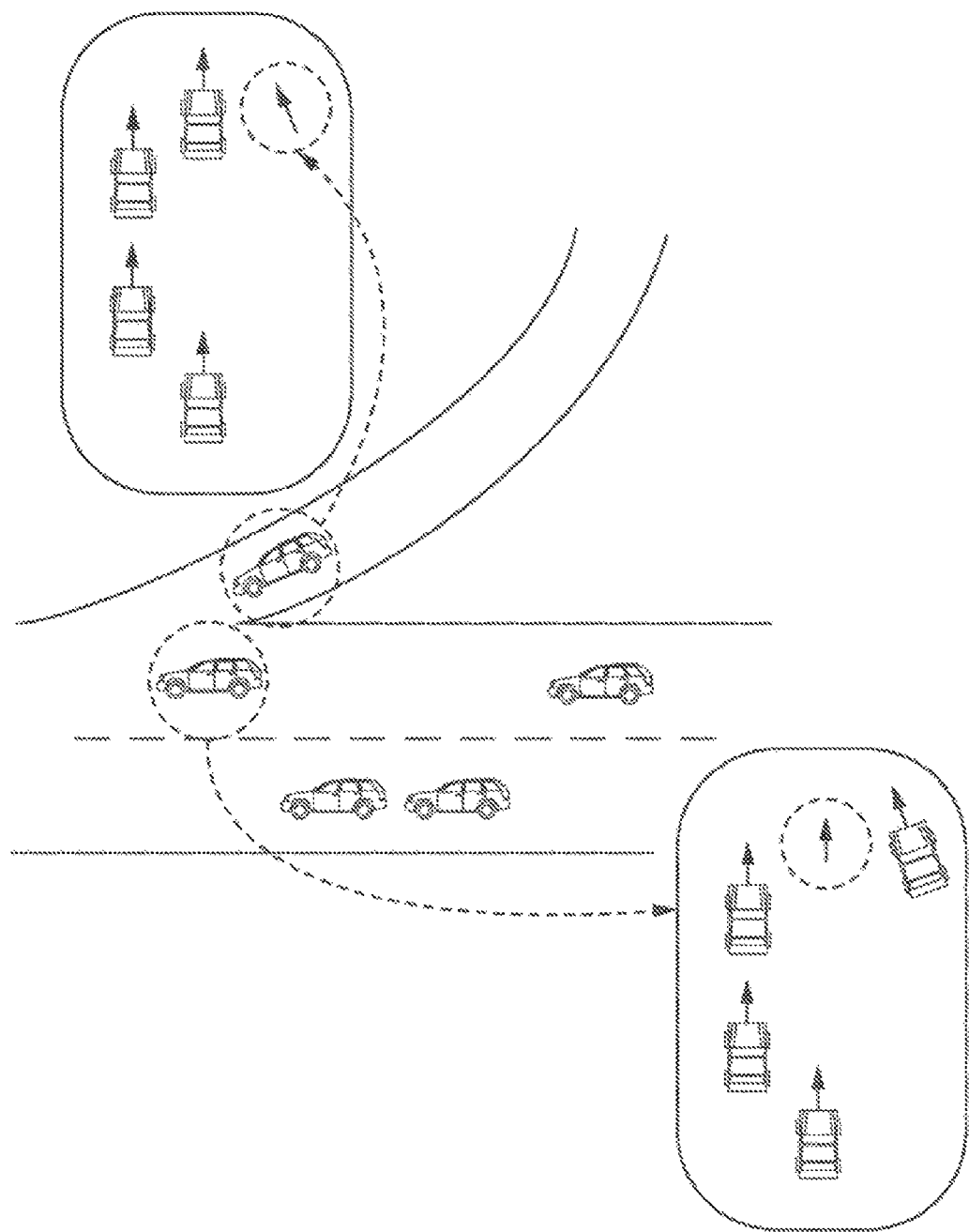
FIG. 22 is a schematic view of data exchange during another driving maneuver.

One of the most interesting potential applications of ad hoc networking is the management of lane mergers and yielding on access ramps and lane closure on expressways. As illustrated in FIG. 22, both the yielding and the merging vehicles are aware of each other's location and speed, which provides their respective cockpit electronic information systems with inputs to assist the driver in a smooth adjustment to the new conditions.

Intelligent Traffic Signalization/Highway Information Systems

Discussed herein above is the capability of Wi-Fi to support concurrent ad hoc networking and infrastructure-based communications. Whereas intelligent traffic lights would be part of the roadside infrastructure, they would need to use the channels allocated for ad hoc networking in order to be effective, since it is only these channels that are regularly monitored by vehicles. Using Wi-Fi, an intelligent traffic light could, for example:

transmit a "yellow light" notification to approaching vehicles alert vehicles in the transversal direction of oncoming traffic at high speeds[27]

[27] If oncoming vehicles are not equipped with Wi-Fi but the traffic light can detect them with radar.

identify vehicles that run red lights[28]

[28] The traffic light would request the registration from the vehicle that ran through the light. The request would be authenticated, at the ATP level, as coming from an authorized client. In fact, this would create a deterrent that would probably eliminate the problem entirely.

On the other hand, highway information systems (electronic signage, automated toll collection, etc) should not operate on the ad hoc channels (unless it can be determined that substantial bandwidth remains even under the most congested driving conditions). Vehicles could monitor these infrastructure channels as initiated and terminated by driver input functions.

Server

The disclosure of PCT Application serial number PCT/CA98/00986 filed Oct. 23, 1998 entitled TELECOMMUNICATIONS SYSTEM specifies the mechanism whereby an Internet gateway to a hybrid network ("Hybrid Gateway") will forward traffic over one of several alternative wireless data links to the same destination IP address.

One embodiment of the method described is differentiated from the prior art in terms of what it does not incorporate, in contrast to what it does incorporate. In that embodiment, when a packet fails to traverse a segment of the path to an Internet destination, it is the responsibility of the last router, prior to the failed segment, to report the error back to the source (as specified in Internet Engineering Task Force RFC 792). The use of ICMP, as foreseen in RFC 792, is all the more important for wireless extensions to the Internet in that failures to reach mobile nodes arc expected to be a common occurrence, in contrast to the wired portion of the Internet, where failures indicate an unanticipated problem. Therefore the system described in the disclosure complies with. The traffic light would request the registration from the vehicle that ran through the light. The request would be authenticated, at the ATP level, as coming from an authorized client. If fact, this would create a deterrent that would probably eliminate the problem entirely. RFC 792. When a failure over a wireless segment is encountered, the router (i.e. the Hybrid Gateway) returns an ICMP "Unreachable" error to the source. It is the responsibility of the source host to attempt re-transmissions of the IP datagram. In the interim, the Hybrid Gateway will have raised the impedance along the wireless data link used on the first attempt. Therefore, when the re-transmitted datagram arrives from the source host, the routing function will take into account the increased impedance and forward the datagram along a less expensive path.

This embodiment enables the system to "scale" to a level where the data traffic for large numbers of mobile nodes (10,000-100,000 or greater) can be effectively supported by the Hybrid Gateway, without having to allocate memory and system resources (e.g. timers) to keep track of failed packets and re-transmission attempts. An analogy can be drawn between this scenario and a letter that is mailed to an incorrect address. Suppose the addressee no longer lives at that location. The Post Office can not take the responsibility of trying to find the addressee and to deliver the letter, because this would be too costly. The letter is simply returned to the sender. The disclosure describes a similar methodology, which adheres to IETF principles and minimizes cost, whereas the prior art implies that the entity responsible for routing has unlimited resources with which to assume responsibility for delivering failed packets.

REFERENCES

The subject matter of each of the references herein below is incorporated herein by reference.
1. J. D. Case, M. Fedor, M. L. Schoffstail, and C. Davin. "Simple Network Management Protocol (SNMP)", RFC 1157, SNMP Research, Performance Systems International and MIT Laboratory for Computer Science, May, 1990
2. Information processing systems—Open Systems Interconnection, "Specification of Abstract Syntax Notation One (ASN.1)", International Organization for Standardization, International Standard 8824, December 1987.
3. Information processing systems—Open Systems Interconnection, "Specification of Basic Encoding Rules for Abstract Notation One (ASN. 1)", International
4. A. O. Freier, P. Karlton, P. C. Koche, "The SSL Protocol, Version 3.0", Internet Draft, Netscape Communications, March 1996.
5. Internet Engineering Task Force, Perkins, C. (ed.), "IPv6 Mobility Support", March 1995.
6. Narten, T., Nordmark, E., and W. Simpson, "Neighbor Discovery for IP Version 6 (IPv6)", RFC 1970, August 1996.
7. Deering, S. and Hinden, R., "Internet Protocol, Version 6 (IPv6) Specification", RFC 1883, December 1995.
8. Conta, A. and Deering, S., "Internet Control Message Protocol (ICMPv6) for the Internet Protocol Version 6 (IPv6) Specification", RFC 1885, December 1995.

The invention claimed is:
1. A vehicle node configured for use in a vehicular communications network which provides for exchange of data between a plurality of vehicle nodes, said vehicle node comprising:
at least one on-board computing unit which is operable to broadcast identity messages to, and to receive identity messages from the plurality of neighboring vehicle nodes on at least one roadway, the received identity messages enabling said vehicle node to identify, to locate, and to list the plurality of neighboring vehicle nodes, the at least one on-board computing unit also being operable over a radio frequency band, compliant with IEEE 802.11 medium access control (MAC) protocol specification for ad-hoc networking, the identity messages being broadcast from said at least one on-board computing unit on an assigned channel common to the plurality of neighboring vehicle nodes and at an interval of at least several times per second;
said at least one on-board computing unit further comprising a transmitter and a receiver, transmitting operational vehicle event messages, said operational vehicle event messages notifying the plurality of neighboring vehicle nodes of impending operational vehicle events; and
wherein the operational vehicle event includes at least one of acceleration, brake application, lane mergers, turn or lane changes, or passing of neighboring vehicles.
2. The vehicle node as set forth in claim 1, wherein said vehicle node is operable to broadcast a unicast message addressed to a specific one of the plurality of neighboring vehicle nodes.
3. The vehicle node as set forth in claim 2, wherein said vehicle node broadcasts said unicast message when it anticipates that it will overtake a slower one of the neighboring vehicle nodes in an adjacent roadway lane.
4. The vehicle node as set forth in claim 1, wherein said unicast message is acknowledged by said specific one of the plurality of neighboring vehicle nodes to confirm to the vehicle node that said specific one of the plurality of neighboring vehicle nodes is aware of an impending operational vehicle event.
5. The vehicle node as set forth in claim 1, wherein said at least one on-board computing unit is operable to broadcast identity messages including GPS location and heading.
6. The vehicle node as set forth in claim 1, wherein said vehicle node is operable to broadcast identity messages over a predetermined discovery time period that is substantially equal to a time period required to allow said vehicle node to recognize the plurality of neighboring vehicle nodes, wherein both a length of a discovery period and a geographic size of the vehicle neighborhood are adjustable according to an average speed of the plurality of neighboring vehicles nodes in the vehicle neighborhood.
7. The vehicle node as set forth in claim 1, wherein said vehicle node is operable to broadcast periodic announcements of services, including those which utilize a video camera mounted on board the vehicle.
8. A vehicle node as set forth in claim 1, wherein the operational vehicle event includes a passing maneuver intention and said vehicle node transmits notification of the passing maneuver intention to the plurality of neighboring vehicle nodes, as determined by said vehicle node when it anticipates that it will overtake a slower one of the plurality of neighboring vehicle nodes in an adjacent roadway lane.
9. A vehicle node as set forth in claim 1, wherein the operational vehicle event includes a lane change maneuver intention and said vehicle node transmits notification of the lane change maneuver to the plurality of neighboring vehicle nodes, as indicated by use of a turn indicator on the vehicle of said vehicle node.
10. A vehicle node as set forth in claim 1, wherein the operational vehicle event includes at least one of yield and merge maneuver intention and said vehicle node transmits notification of the yield and merge maneuver intention to the plurality of neighboring vehicle nodes, wherein said vehicle node uses information corresponding to location and speed of at least one of said plurality of neighboring vehicle nodes to provide at least one signal to a driver of the vehicle corresponding to the vehicle node.
11. A vehicle node as set forth in claim 1, wherein the operational vehicle event is transmitted using a UDP/IP stack transport mechanism.
12. A vehicle node as set forth in claim 11, wherein the operational vehicle event is further defined as being transmitted using a simple network management protocol (SNMP).

* * * * *